(12) United States Patent
Okouchi

(10) Patent No.: US 11,639,009 B2
(45) Date of Patent: May 2, 2023

(54) PORTABLE CUTTING DEVICES

(71) Applicant: MAKITA CORPORATION, Anjo (JP)

(72) Inventor: Katsumi Okouchi, Anjo (JP)

(73) Assignee: MAKITA CORPORATION, Anjo (JP)

(*) Notice: Subject to any disclaimer, the term of this patent is extended or adjusted under 35 U.S.C. 154(b) by 471 days.

(21) Appl. No.: 15/824,585

(22) Filed: Nov. 28, 2017

(65) Prior Publication Data
US 2018/0169885 A1 Jun. 21, 2018

(30) Foreign Application Priority Data
Dec. 15, 2016 (JP) .............................. JP2016-243629

(51) Int. Cl.
*B26D 7/18* (2006.01)
*B23D 59/00* (2006.01)
(Continued)

(52) U.S. Cl.
CPC ......... *B26D 7/1854* (2013.01); *B23D 59/006* (2013.01); *B26D 1/14* (2013.01); *B27B 9/00* (2013.01)

(58) Field of Classification Search
CPC .......... B26D 7/01; B26D 7/18; B26D 7/1845; B26D 7/1863; B23Q 11/0042; B23Q 11/0046; B23Q 11/006; B23Q 11/0071
See application file for complete search history.

(56) References Cited

U.S. PATENT DOCUMENTS 1,623,290 A * 4/1927 Wappat .................... B27B 9/00
30/377
1,708,345 A * 4/1929 Wodack et al. .......... B27B 9/02
30/377
(Continued)

FOREIGN PATENT DOCUMENTS

JP H03-117528 U 12/1991
JP H10-225927 A 8/1998
(Continued)

OTHER PUBLICATIONS

Aug. 28, 2020 Office Action issued in Japanese Patent Application No. 2016-243629.
(Continued)

*Primary Examiner* — Kenneth E Peterson
*Assistant Examiner* — Richard D Crosby, Jr.
(74) *Attorney, Agent, or Firm* — Oliff PLC

(57) ABSTRACT

A dust-proof circular saw includes a base placed on a workpiece, a circular saw main body supported on an upper surface side of the base and equipped with an electric motor, and a saw blade driven by the electric motor extending downwardly from the base. The dust-proof circular saw further includes a cooling fan driven by the electric motor to guide air to the electric motor for cooling the electric motor, as well as to a blower mechanism. The blower mechanism blows the cutting chips away by blowing the air generated by the fan out of the circular saw main body in a user-adjustable direction. The blower mechanism has an air outlet configured to blow out the air, and an orientation change mechanism capable of changing the orientation of the air outlet.

11 Claims, 18 Drawing Sheets

(51) Int. Cl.
  *B27B 9/00* (2006.01)
  *B26D 1/14* (2006.01)

(56) References Cited

U.S. PATENT DOCUMENTS

| | | | | |
|---|---|---|---|---|
| 2,103,050 A * | 12/1937 | White | A47L 5/32 | 285/7 |
| 2,203,088 A * | 6/1940 | Hansson | A47L 9/0613 | 285/7 |
| 2,395,237 A * | 2/1946 | Swenson | B23D 55/10 | 83/98 |
| 2,710,204 A * | 6/1955 | Faith-Ell | A47L 9/0613 | 285/7 |
| 3,565,464 A * | 2/1971 | Wolf | A47L 9/242 | 285/321 |
| 3,662,796 A * | 5/1972 | Batistelli | B23D 59/006 | 144/252.1 |
| 3,873,862 A * | 3/1975 | Butler | H02K 7/145 | D8/66 |
| 3,882,598 A * | 5/1975 | Earle | B23D 59/006 | 144/252.1 |
| 4,192,104 A * | 3/1980 | Patenaude | B24B 55/06 | 144/252.1 |
| 4,696,497 A * | 9/1987 | Schwarzensteiner | F16L 37/0987 | 285/307 |
| D315,854 S * | 4/1991 | Kawakami | D8/66 | |
| 5,042,844 A * | 8/1991 | Iida | A47L 9/242 | 285/251 |
| 5,074,044 A * | 12/1991 | Duncan | B23D 59/006 | 30/124 |
| 5,084,971 A * | 2/1992 | Remington | B23D 59/006 | 30/123 |
| 5,121,543 A * | 6/1992 | Onose | B23Q 11/0042 | 30/124 |
| 5,692,856 A * | 12/1997 | Newman, Jr. | B25G 1/04 | 403/109.5 |
| 5,701,676 A * | 12/1997 | Itoh | B23D 59/02 | 30/388 |
| 5,737,843 A * | 4/1998 | Fringer | B27G 19/04 | 30/390 |
| 5,822,864 A * | 10/1998 | Campbell | B23D 59/002 | 30/123 |
| 5,890,292 A * | 4/1999 | Stark | B23D 45/16 | 30/124 |
| 5,927,171 A * | 7/1999 | Sasaki | B23D 59/006 | 83/165 |
| D415,001 S * | 10/1999 | Welsh | D15/133 | |
| 6,014,811 A | 1/2000 | Taomo et al. | | |
| 6,199,920 B1 * | 3/2001 | Neustadtl | F16L 25/0045 | 285/319 |
| 6,219,922 B1 * | 4/2001 | Campbell | B23D 59/006 | 30/124 |
| 6,435,567 B2 * | 8/2002 | Kikumori | F16L 25/0036 | 285/319 |
| 6,557,261 B1 * | 5/2003 | Buser | B23D 59/006 | 30/124 |
| 6,609,442 B2 * | 8/2003 | Dibbern, Jr. | B23D 45/042 | 76/112 |
| 6,748,660 B2 * | 6/2004 | Buser | B23Q 11/0046 | 125/12 |
| 6,935,939 B1 * | 8/2005 | Buser | B23Q 11/0046 | 30/124 |
| 7,047,647 B1 * | 5/2006 | Muller | B23D 59/006 | 30/124 |
| D525,503 S * | 7/2006 | Waldron | D8/66 | |
| 7,234,733 B2 * | 6/2007 | Valentini | A47L 9/0072 | 15/321 |
| 7,380,343 B2 * | 6/2008 | Yoshimura | B23D 59/006 | 30/388 |
| 7,455,090 B2 * | 11/2008 | Thomas | B23Q 11/005 | 144/117.1 |
| 7,465,328 B2 * | 12/2008 | Trautner | B23D 59/006 | 173/71 |
| 7,526,866 B2 * | 5/2009 | Schnell | B23D 59/006 | 144/252.1 |
| 7,810,848 B2 * | 10/2010 | Yoshino | F16L 37/098 | 285/305 |
| 7,908,951 B2 * | 3/2011 | Bohne | B23Q 11/08 | 83/100 |
| 7,976,363 B2 * | 7/2011 | Reich | B23Q 11/0046 | 451/451 |
| 8,037,610 B2 * | 10/2011 | Chambers | B23D 59/006 | 30/124 |
| 8,113,543 B1 * | 2/2012 | Romani | A47L 9/248 | 285/7 |
| 8,230,548 B2 * | 7/2012 | Van Wagenen | H02G 1/1297 | 15/301 |
| 8,782,906 B2 * | 7/2014 | Moreno | B23D 59/006 | 30/390 |
| 9,242,304 B2 * | 1/2016 | Martin | B23D 59/006 | |
| 9,523,453 B2 * | 12/2016 | Arnold | F16L 37/0985 | |
| 9,821,389 B2 * | 11/2017 | Buser | A47L 1/00 | |
| 9,844,176 B2 * | 12/2017 | Grande | A01D 43/0636 | |
| 9,999,986 B2 * | 6/2018 | Mascari | B26B 25/002 | |
| 10,245,663 B2 * | 4/2019 | Koegel | B23D 45/06 | |
| 10,295,181 B2 * | 5/2019 | Sugatani | F23J 13/04 | |
| 10,443,768 B1 * | 10/2019 | McConnell | F16L 25/14 | |
| 10,502,353 B2 * | 12/2019 | Schumacher | F16L 37/0987 | |
| 11,123,839 B2 * | 9/2021 | Loveless | B24B 55/102 | |
| 2002/0053757 A1 * | 5/2002 | Andersen | B29B 17/0005 | 264/428 |
| 2002/0152731 A1 * | 10/2002 | Reich | B23Q 11/0046 | 55/385.1 |
| 2004/0088864 A1 * | 5/2004 | Whited | B26B 25/002 | 30/123 |
| 2004/0093743 A1 * | 5/2004 | Fukuoka | B23D 59/00 | 30/391 |
| 2004/0107584 A1 * | 6/2004 | Yoshida | B23D 59/006 | 30/388 |
| 2004/0149352 A1 | 8/2004 | Thomas | | |
| 2006/0053629 A1 * | 3/2006 | Martin | B27B 9/02 | 30/123 |
| 2006/0060507 A1 | 3/2006 | Kusch et al. | | |
| 2006/0065097 A1 | 3/2006 | Yoshimura et al. | | |
| 2007/0044609 A1 * | 3/2007 | Brazell | B23D 59/006 | 83/100 |
| 2007/0289075 A1 * | 12/2007 | Gopalan | E04H 4/1672 | 15/1.7 |
| 2008/0011138 A1 * | 1/2008 | Brazell | B23D 59/006 | 83/100 |
| 2008/0098605 A1 * | 5/2008 | Whited | B26B 25/002 | 30/276 |
| 2008/0209739 A1 * | 9/2008 | Saitoh | B23D 59/006 | 30/124 |
| 2009/0007441 A1 | 1/2009 | Schnell et al. | | |
| 2009/0074411 A1 | 3/2009 | Bernard et al. | | |
| 2009/0114072 A1 * | 5/2009 | Nishikawa | B23D 59/006 | 83/168 |
| 2009/0165312 A1 * | 7/2009 | Haas | B24B 55/052 | 30/390 |
| 2009/0288533 A1 * | 11/2009 | Meredith | B23D 59/006 | 83/168 |
| 2009/0313834 A1 * | 12/2009 | Martin | B23D 59/006 | 30/124 |
| 2010/0269654 A1 * | 10/2010 | Needel | B23D 59/006 | 83/100 |
| 2011/0023674 A1 * | 2/2011 | Stasiewicz | B23D 59/006 | 83/112 |
| 2011/0079125 A1 * | 4/2011 | Kuo | B23D 59/006 | 83/168 |
| 2011/0079207 A1 * | 4/2011 | Guth | B23D 45/16 | 125/13.01 |
| 2011/0214303 A1 * | 9/2011 | Inayoshi | B27G 19/04 | 30/374 |
| 2011/0214546 A1 | 9/2011 | Inayoshi et al. | | |
| 2012/0192440 A1 * | 8/2012 | Jerabek | B23D 51/16 | 30/393 |

(56) References Cited

U.S. PATENT DOCUMENTS

| | | | | |
|---|---|---|---|---|
| 2013/0115863 A1* | 5/2013 | Mizutani | ................ | B24B 55/10 |
| | | | | 15/246 |
| 2014/0223748 A1* | 8/2014 | Guth | ...................... | B27G 19/04 |
| | | | | 30/391 |
| 2014/0331505 A1 | 11/2014 | Kume et al. | | |
| 2014/0366383 A1* | 12/2014 | Dyer | ................... | B23Q 11/005 |
| | | | | 30/123 |
| 2015/0359171 A1* | 12/2015 | Butler | ..................... | A01D 34/73 |
| | | | | 56/295 |
| 2016/0016241 A1* | 1/2016 | Taylor | ................. | B23D 45/062 |
| | | | | 83/100 |
| 2016/0016270 A1* | 1/2016 | Batres | ................. | B23D 59/006 |
| | | | | 83/100 |
| 2016/0031104 A1* | 2/2016 | Mascari | ............... | B26B 25/002 |
| | | | | 30/124 |
| 2018/0169885 A1* | 6/2018 | Okouchi | ................. | B26D 1/14 |

FOREIGN PATENT DOCUMENTS

| | | |
|---|---|---|
| JP | 2006-08559 A | 1/2006 |
| JP | 2010-052117 A | 3/2010 |
| JP | 2011-183465 A | 9/2011 |
| JP | 2014-217921 A | 11/2014 |
| WO | 2007055096 A1 | 5/2007 |

OTHER PUBLICATIONS

Dec. 14, 2020 Office Action issued in Japanese Patent Application No. 2016-243629.

* cited by examiner

PORTABLE CUTTING DEVICES

CROSS-REFERENCE TO RELATED APPLICATIONS

This application claims priority to Japanese patent application serial number 2016-243629 filed Dec. 15, 2016, the contents of which are incorporated herein by reference in their entirety for all purposes.

BACKGROUND

The present invention relates to portable cutting devices, such as a portable circular saw and particularly relates to, for example, a dust-proof circular saw having a dust box for collecting cutting chips.

A portable circular saw disclosed in Japanese Laid-Open Patent Publication No. 2006-88559, No. 2011-183465 and No. 2014-217921 includes a base to be placed on a workpiece, a cutting device main body supported on an upper surface side of the base and is equipped with an electric motor. A workpiece can be cut when a saw blade extending downwardly from the base is driven by the electric motor. The cutting device main body includes a fan driven by the electric motor and a blower mechanism. The fan guides air into a cutting device main body to cool the electric motor. The blower mechanism blows the air generated by the fan out of the cutting device main body.

A portable circular saw according to Japanese Laid-Open Patent Publication No. 2006-88559 has a marking line guide at a front end of the base. A workpiece can be cut along a marking line as the saw blade of said saw moves along the marking line by moving the marking line guide along the marking line. The blower mechanism includes a nozzle oriented forward toward the marking line guide. Therefore, the cutting chips on the marking line can be blown away by the air blown out of the nozzle. As a result, the marking line can be easily viewed so that the base can be easily moved along the marking line.

A blower mechanism according to Japanese Laid-Open Patent Publication No. 2011-183465 has a duct configured to inject air in a transverse direction toward a cutting edge of a saw blade. The air blown out of the duct blows the cutting chips at the side of the saw blade away. This avoids blown away cutting chips from gathering again at a cutting region of the workpiece to be cut.

A portable circular saw according to Japanese Laid-Open Patent Publication No. 2014-217921 has an angular guide configured to hold a cutting device main body at a desired angle in a rightward/leftward direction relative to the base. A hole and a groove are provided as part of the angular guide. The blower mechanism includes a nozzle oriented forward toward a marking line guide. The air blown out of the nozzle passes through the hole or the groove of the angular guide to blow away cutting chips on a marking line.

As described in the prior art above, conventional blower mechanisms for portable cutting devices are either fixed at a predetermined angle, or alternatively have a nozzle of the blower mechanism fixed such that the air is blown on the marking line or in a cutting region. Therefore, there is a need for a portable cutting device having a more versatile blower mechanism.

SUMMARY

In one aspect of the present disclosure, a portable cutting device according to the present invention includes a base to be placed on a workpiece, a cutting device main body supported on an upper surface side of the base and equipped with an electric motor, and a saw blade driven by the electric motor and extending downwardly from the base. The portable cutting device further includes a fan driven by the electric motor. The fan generates the air flow to guide the air to the electric motor for cooling said motor, and to a blower mechanism. The blower mechanism blows the air out of the cutting device main body to blow the cutting chips away. The blower mechanism has an air outlet configured to blow out the air, and an orientation change mechanism capable of changing the orientation of the air outlet.

Therefore, the orientation of air blown out of the blower mechanism can be set at a desired angle in accordance with, for example, the working condition. For example, the orientation of the air can be adjusted to a position of the cutting chips to be removed. Alternatively, the cutting chips floating in front of the eyes of the user can be blown away as the orientation of blowing air is horizontally or upwardly directed. This configuration is effective e.g. during cutting of a siding board(s) or a plaster board(s) when fine chips may be produced, since the drifting fine chips at a work-site may be blown away in such a direction as not to disturb work. This may facilitate efficient operation of the cutting device and help to improve the environment at the work-site.

In another aspect of the disclosure, the portable cutting device includes a blower mechanism. The blower mechanism has the air outlet and is oriented in such a direction that the air outlet can blow away the chips floating in the air in front of the cutting device main body. As a result, the chips floating in front of the eyes of a user may be blown away in a direction so as to not disturb work.

DETAILED DESCRIPTION

Figure 1:
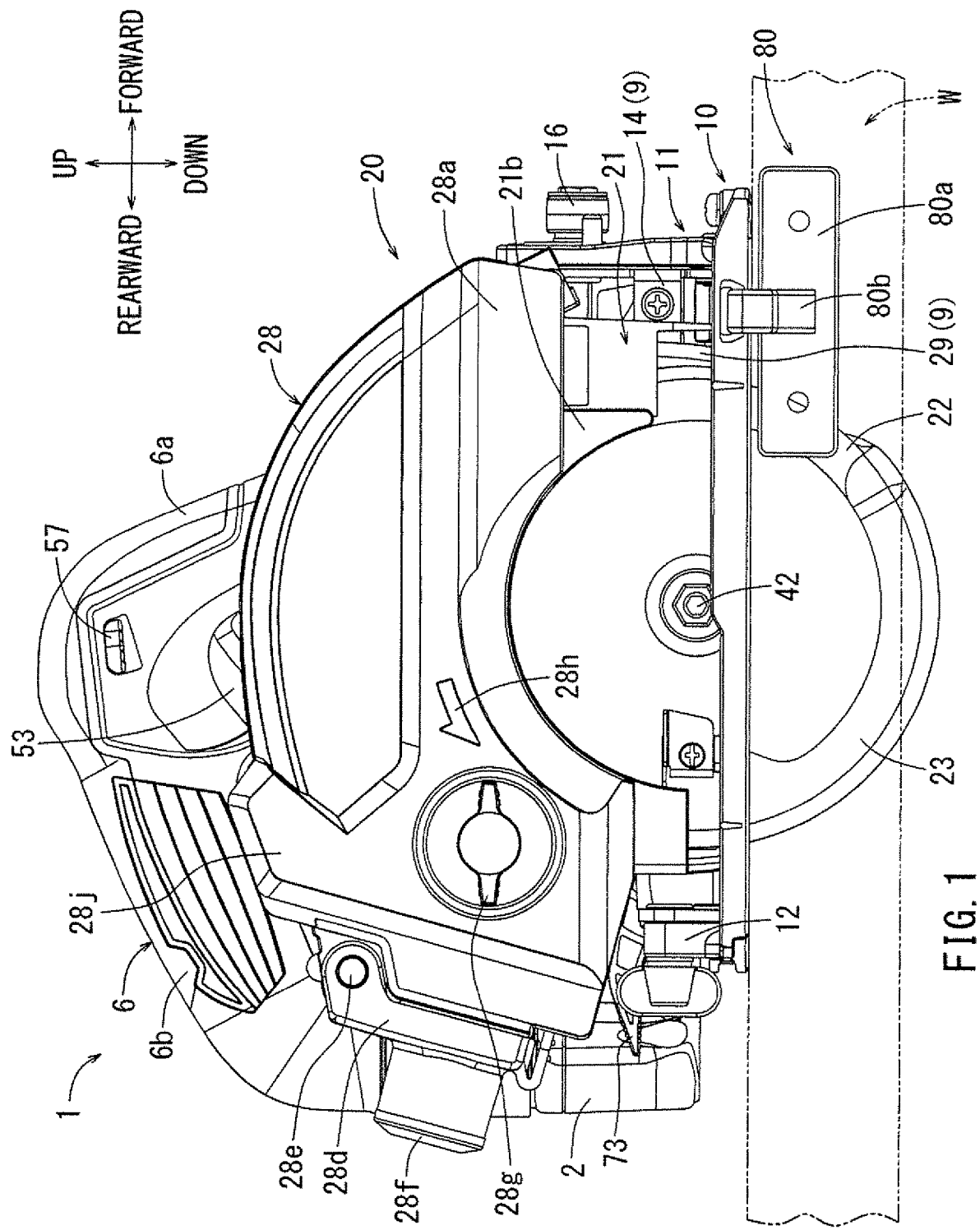
FIG. 1 is a right side view of a portable circular saw.
Figure 4:
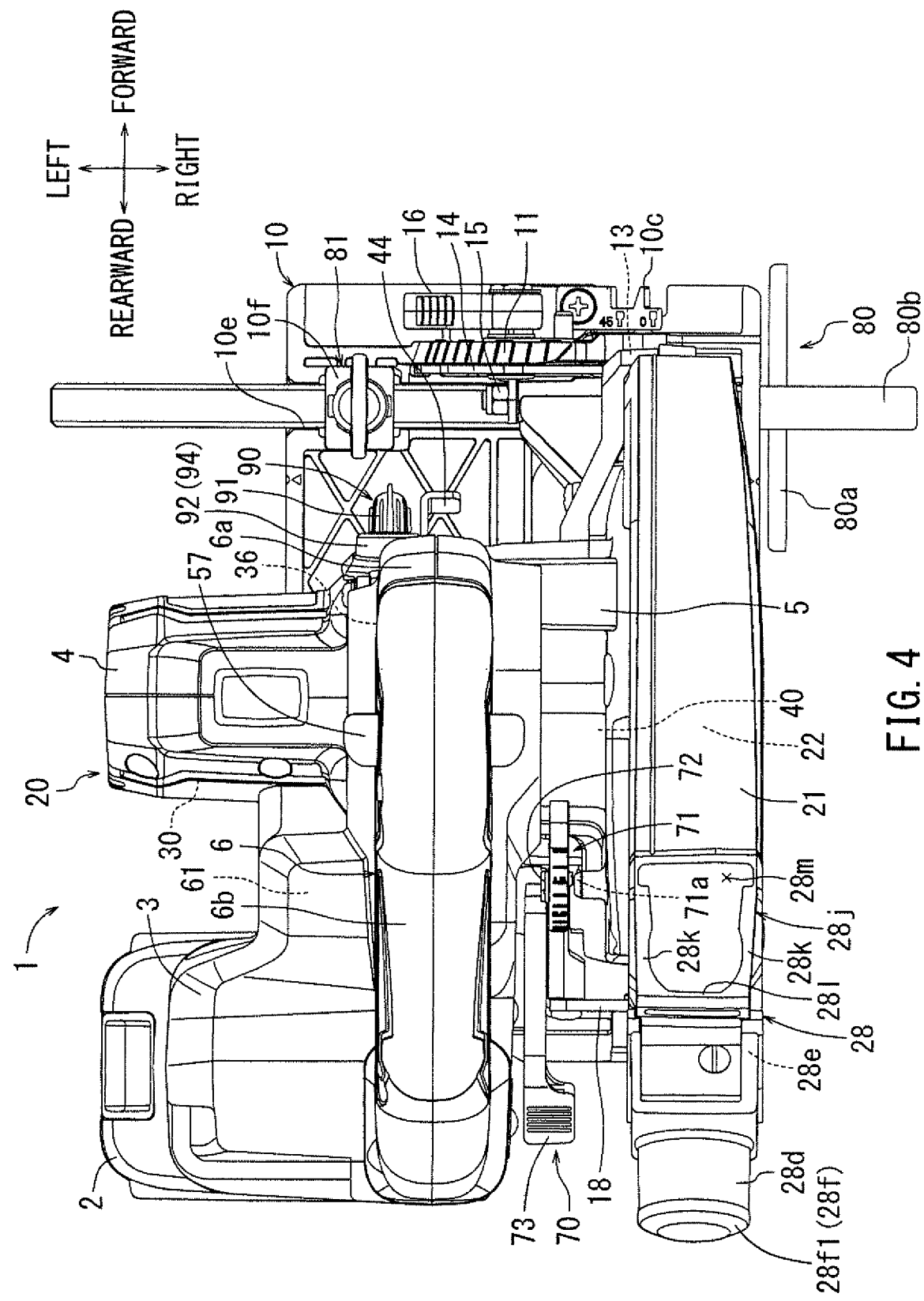
FIG. 4 is a plan view of the portable circular saw.

One exemplary embodiment according to the present disclosure will now be described with reference to the drawings. FIGS. 1 and 4 show a dust-proof circular saw (portable circular saw) 1 as one example of a portable cutting device that is moved by the hand of a user who is grasping the saw 1. This device is utilized mainly for cutting siding boards, plasterboards etc., and is also referred to as a dust collecting circular saw. The dust-proof circular saw 1 will now be described as follows using the frontward/rearward, rightward/leftward and upward/downward directional axes. A front side corresponds to a direction in which the dust-proof circular saw 1 is advanced when the dust-proof circular saw 1 cuts a workpiece W. A rightward/leftward direction will be determined based on the position of the user located directly to the rear of the dust-proof circular saw 1. The directions are directionally indicated in the legends present in the figures.

Figure 5:
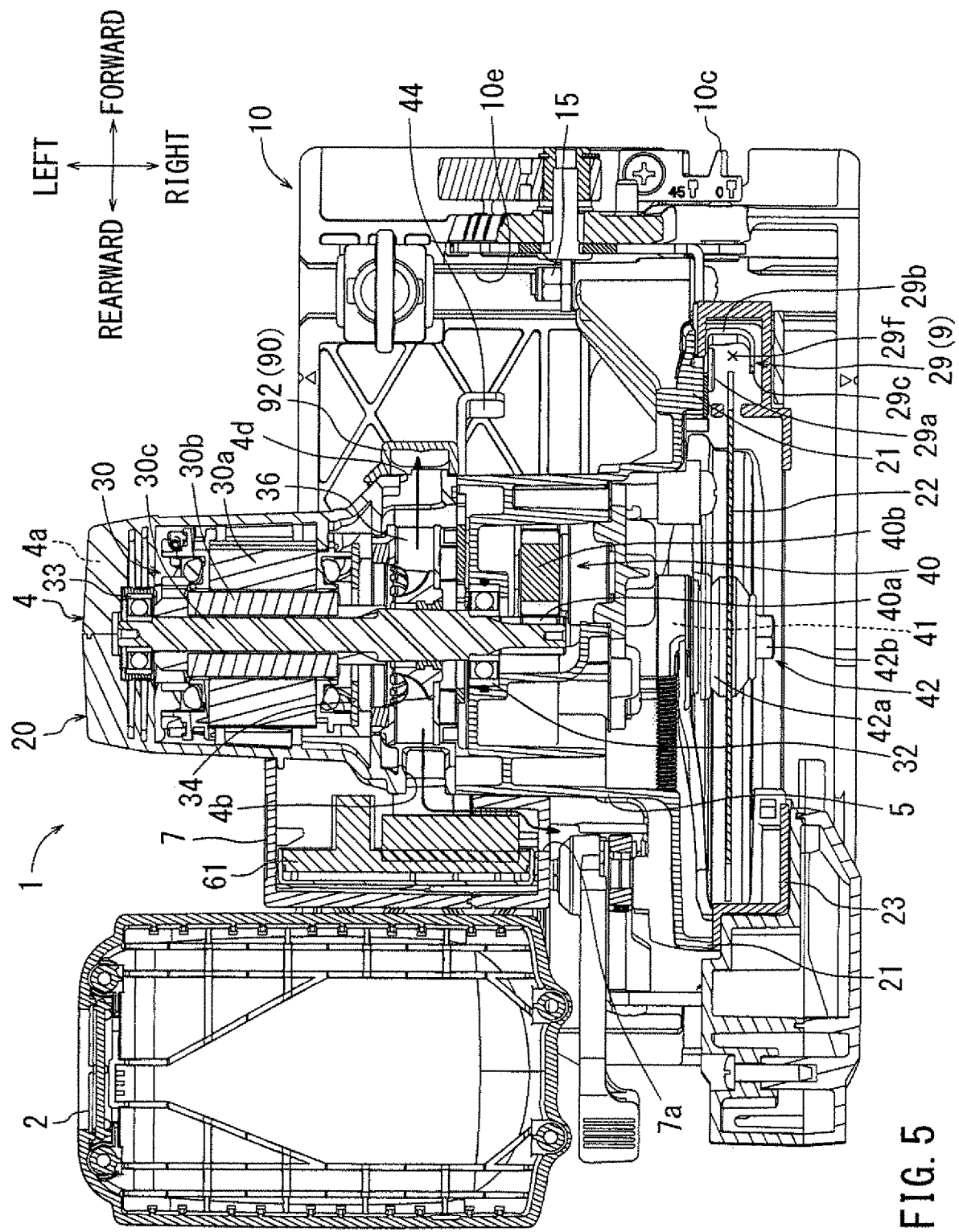
FIG. 5 is a horizontal cross sectional view of the portable circular saw.

As shown in FIG. 1, the dust-proof circular saw 1 includes a circular saw main body (also referred to as a cutting device main body) 20 and a base 10 which supports the circular saw main body 20 in an angle-adjustable manner. As shown in FIGS. 4 and 5, the circular saw main body 20 includes an electric motor 30 for rotating a disc blade (saw blade) 22 and a battery 2 which supplies electric power to the electric motor 30.

As shown in FIGS. 4 and 5, the electric motor 30 is a brushless motor that is stored in a motor housing 4. The electric motor 30 includes a stator 30a fixed on an inner peripheral surface of the motor housing 4 and a rotor 30b rotatably supported and positioned at an inner peripheral side of the stator 30a. A sensor substrate 34 has a magnetic sensor for detecting a rotating angle of the rotor 30b. The sensor substrate 34 is mounted on a right side of the stator 30a (lower side in FIG. 5). A motor shaft 30c is inserted into the rotor 30b so that the rotor 30b is fixed to the motor shaft 30c. A left end of the motor shaft 30c is rotatably supported to rotate about the central longitudinal axis of the motor housing 4 in the rightward/leftward direction via a bearing 33. A right end of the motor shaft 30c extends from the motor housing rightward into the gear housing 5 and the right end is rotatably supported via bearing 32 to rotate about the same central longitudinal axis.

As shown in FIG. 5, a gear housing 5 is provided on a right side of the motor housing 4. A reduction gear mechanism 40, which serves to reduce rotational output of the electric motor 30, is arranged within the gear housing 5. The reduction gear mechanism 40 includes a pinion gear 40a attached to an end of the motor shaft 30c, an intermediate gear 40b meshed with the pinion gear 40a, and a spindle 41 meshed with the intermediate gear 40b. The spindle 41 is positioned below the motor shaft 30c and is rotatably supported by the gear housing 5 to rotate about an axis, which is parallel to the motor shaft 30c. A distal end of the spindle 41 protrudes rightward from the gear housing and the saw blade 22 is attached to the distal end.

As shown in FIGS. 1 and 5, the saw blade 22 is fixed to the distal end of the spindle 41 by an attachment body 42. The attachment body 42 includes an inner flange 42a for supporting the saw blade 22 from the left side and an outer flange 42b for supporting the saw blade 22 from the right side. An outer radial periphery of the saw blade 22 may be covered with a cover body (9, 21 and 23). The cover body includes a fixed cover 21 for covering substantially the upper half of the outer radial periphery of the saw blade 22, a movable cover 23 movable at a rear part of the fixed cover 21, and an auxiliary cover 9 movable at a front part of the fixed cover 21. A dust box 28 is connected to an upper part of the fixed cover 21 for receiving the cutting chips.

Figure 2:
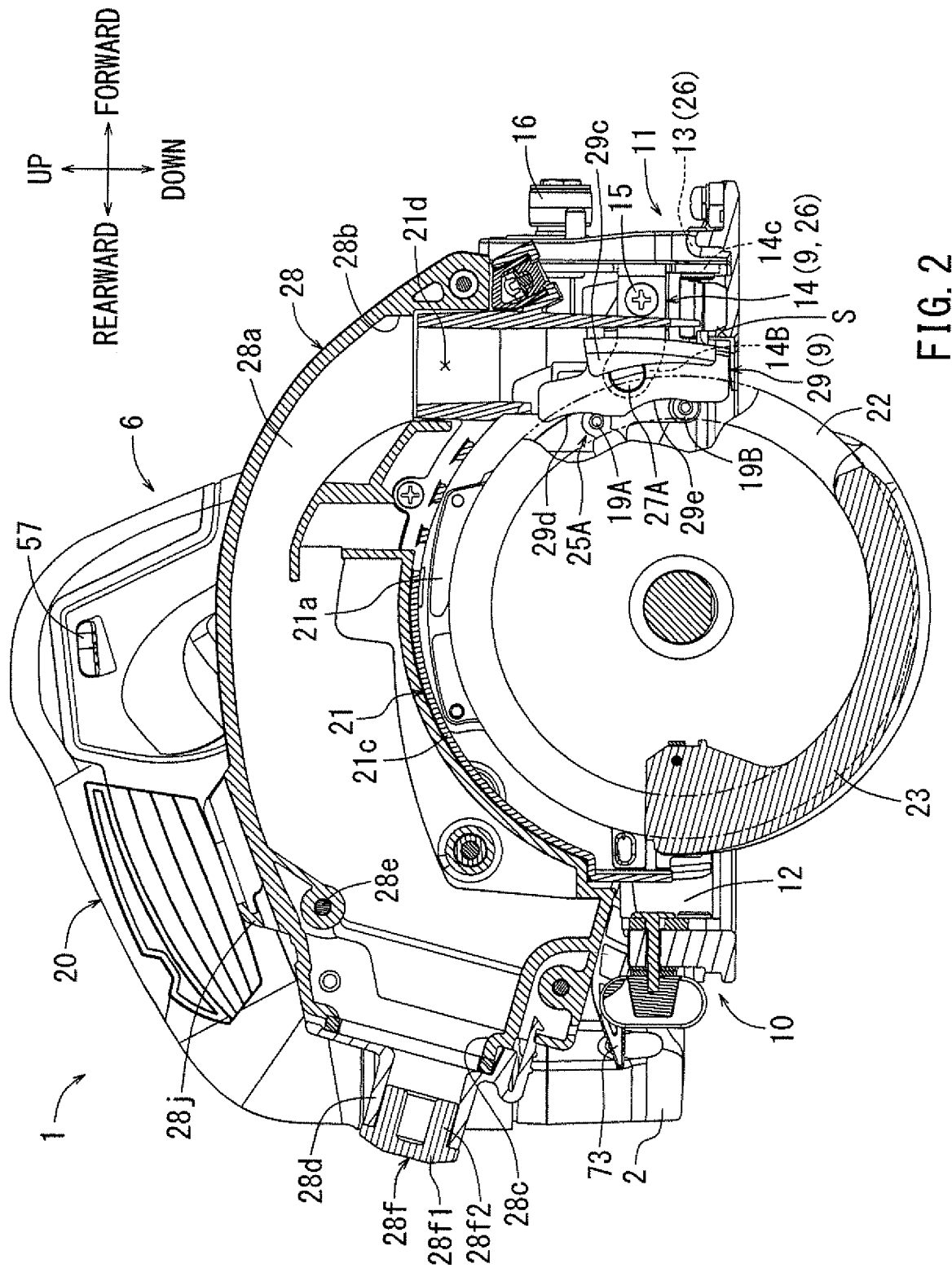
FIG. 2 is a right side view of the portable circular saw that is partially removed.

As shown in FIG. 5, the fixed cover 21 is provided on the right side of the gear housing 5 and extends from the gear housing 5. As shown in FIGS. 1 and 2, the fixed cover 21 includes a left side surface 21a which is positioned on the left side of the saw blade 22 and fixed to the circular saw main body 20, a right side surface 21b which covers a right side surface of an upper region on the outer radial periphery of the saw blade 22, and a peripheral wall 21c which connects upper ends of the left side surface 21a with the right side surface 21b. The peripheral wall 21c is formed in a circular arc shape in the plane comprising the upward-downward and leftward-rightward directions along the upper region of the outer radial periphery of the saw blade 22. An upwardly extending discharge pipe 21d is formed at a front part of the fixed cover 21 to be connected to an opening 28b of the dust box 28.

As shown in FIGS. 1 and 2, the dust box 28 includes a box main body 28a extending along an upper outer peripheral edge of the fixed cover 21. An opening 28b is formed at a front part of the box main body 28a to which the discharge pipe 21d of the fixed cover 21 is connected. The saw blade 22 rotates to cut the workpiece W in a direction as indicated by an arrow 28h that is provided on the right side surface of the dust box 28. The cutting chips are blown up at the front side of the saw blade 22 when produced by the workpiece W. The blown up chips are introduced from the fixed cover 21 via pipe 21d to the box main body 28a and accumulate in the box main body 28a.

As shown in FIGS. 1 and 2, the dust box 28 has a lever 28g on a right side surface thereof. The dust box 28 is removably attached to the circular saw main body 20 by utilizing a male thread which is integrally formed with the lever 28g. A discharge hole 28c is formed at the rear part of the box main body 28a. A cover 28d for opening and closing the discharge hole 28c is pivotally attached to the box main body 28 by a pin 28e. When the chips accumulate within the box main body 28a to the extent that they need to be discharged, the box main body 28a may be removed first from the circular saw main body 20. Subsequently, the cover 28d may be opened through pivotally rotating pin 28e, which opens the discharge hole 28c so that the accumulated chips may be discharged from the interior of the box main body 28a to the outside.

As shown in FIG. 2, a through hole is formed at a rear portion of the cover 28d that is closed by a cap 28f. A vacuum device can be connected to the through hole of the cover 28d via a pipe after the cap 28f is removed from the cover 28d. In this way, the chips within the dust box 28 may be suctioned to the vacuum device via the pipe.

As shown in FIGS. 1 and 2, the movable cover 23 is positioned at a lower rear side of the fixed cover 21 and covers a rear lower region of the outer radial periphery of the saw blade 22. The movable cover 23 has a circular arc shape and pivots around a radial center of the saw blade 22. The movable cover 23 is biased to cover the lower region of the saw blade 22 i.e. toward the front side, by a tension spring.

When cutting the workpiece W, a leading end (front end) of the movable cover 23 abuts the workpiece W such that upon contact with the workpiece the movable cover 23 may be pushed backward and upward against the biasing force to open the lower region of the saw blade 22, for the cutting of the workpiece.

Figure 3:
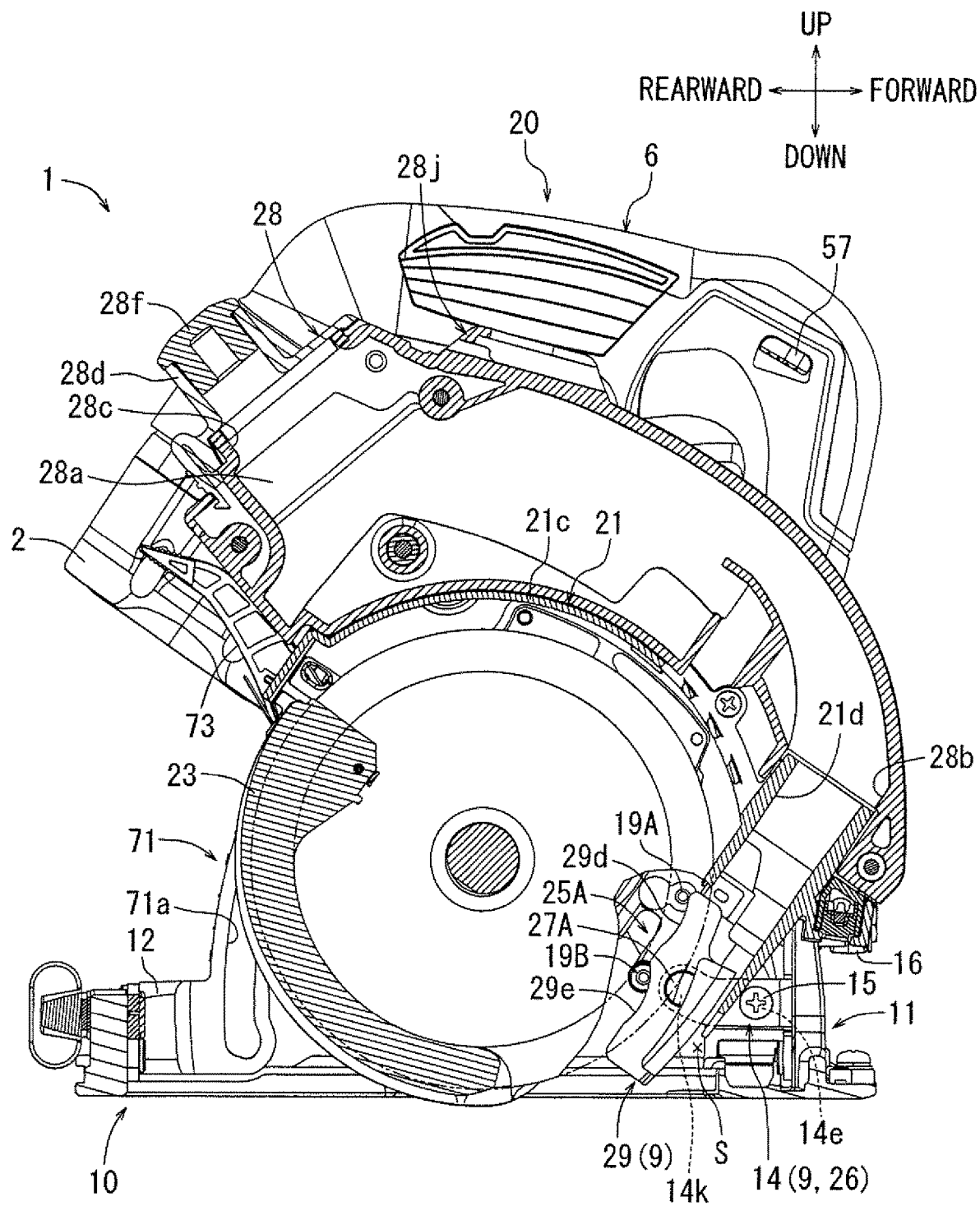
FIG. 3 is a right side view of the portable circular saw that is partially removed when the circular saw main body is positioned in an upper position.

As shown in FIGS. 2 and 3, the auxiliary cover 9 is positioned on a lower front side of the fixed cover 21. The auxiliary cover 9 is positioned at the front outer radial periphery of the saw blade 22 and covers a gap S between the front end of the fixed cover 21 and the base 10, at a tangent to the lower front portion of the saw blade 22. The gap S varies in accordance with the angle of the circular saw main body 20 with respect to the base 10. In response to the varying size of the gap S, the auxiliary cover 9 moves with respect to the fixed cover 21 or the base 10 in accordance with the angle of the circular saw main body 20 with respect to the base 10. Therefore, the auxiliary cover 9 is able to efficiently prevent the cutting chips from scattering forward through the gap S. The auxiliary cover 9 includes a dust cover 29 connected to the circular saw main body 20 or the fixed cover 21, and an angular guide 14 that connects the dust cover 29 to the base 10.

As shown in FIGS. 12 to 15, the dust cover 29 has a vertically elongated first side wall 29a, a second side wall 29c laterally opposed to the first side wall 29a, and a front wall 29b for connecting the front end of the first side wall 29a with the second side wall 29c. A hole 29g is formed in the vertical central area of the first side wall 29a. A shaft member 27A shown in FIG. 2 is inserted into the hole 29g as well as into the hole 14k of the angular guide 14. In this way the dust cover 29 is rotatably connected to the angular guide 14 via the shaft member 27A.

Figure 12:
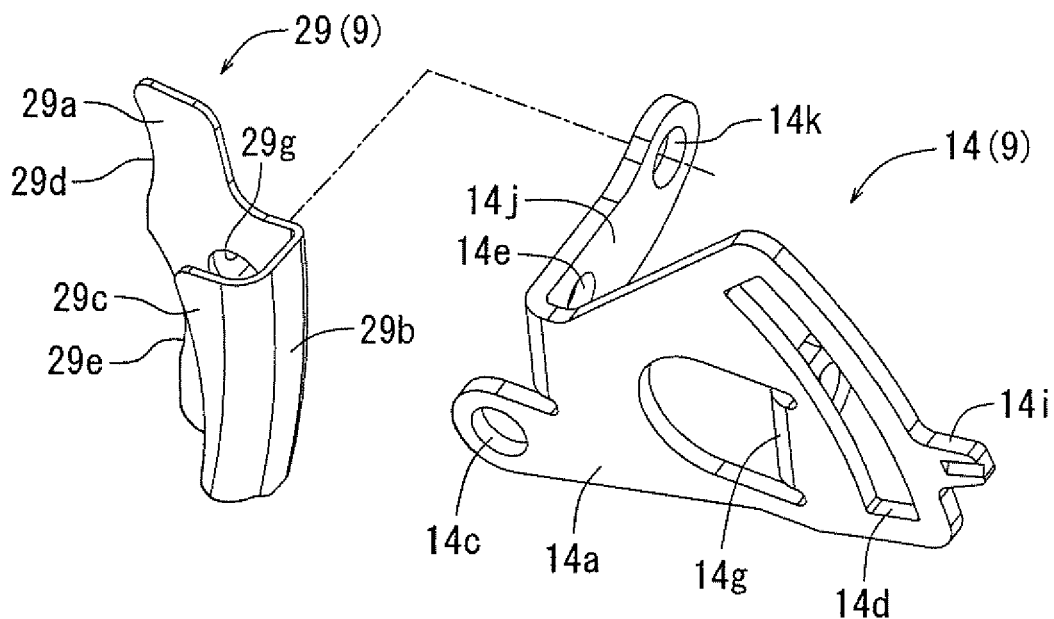
FIG. 12 is an exploded perspective view of a dust cover and an angular guide.
Figure 13:
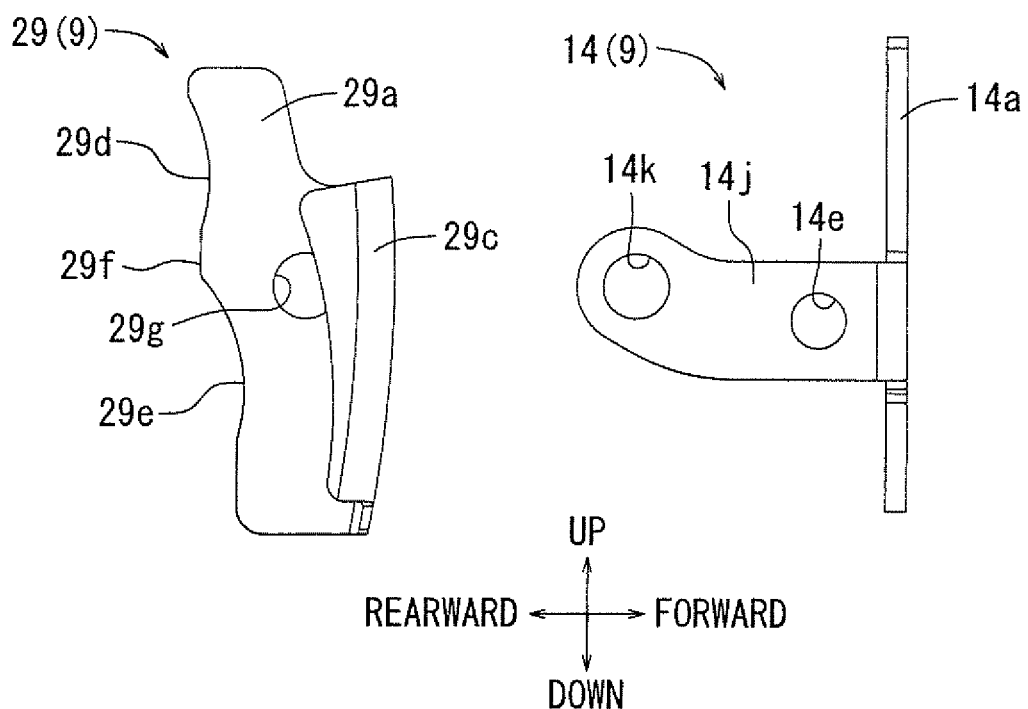
FIG. 13 is an exploded right side view of the dust cover and the angular guide.

As shown in FIGS. 12 and 13, cam surfaces 29d and 29e are defined on the rear edge of the first side wall 29a. The cam surface 29d is positioned on an upper region of the rear edge of the first side wall 29a and may be positioned above and rearward of the hole 29g. The cam surface 29c is positioned in a lower region of the rear edge of the first side wall 29a and may be positioned below and rearward of the hole 29g. The cam surfaces 29d and 29e are both forwardly recessed. A rearward protrusion 29f is formed on the rear edge of the first side wall 29a vertically between the cam surfaces 29d and 29e.

As shown in FIG. 13, the vertical length of the second side wall 29c is shorter than that of the first side wall 29a. An upper end of the second side wall 29c is positioned below an upper end of the first side wall 29a, and a lower end of the second side wall 29c is positioned above the lower end of the first side wall 29a. A front-to-rear width of the second side wall 29c is also narrower than that of the first side wall 29a, and the rear edge of the second side wall 29c is positioned forward relative to the rear edge of the first side wall 29a. The rear edge of the second side wall 29c is configured in a curved arcuate shape, extending in a shape complementary to the outer peripheral edge of the saw blade 22 as shown in FIG. 2.

Figure 15:
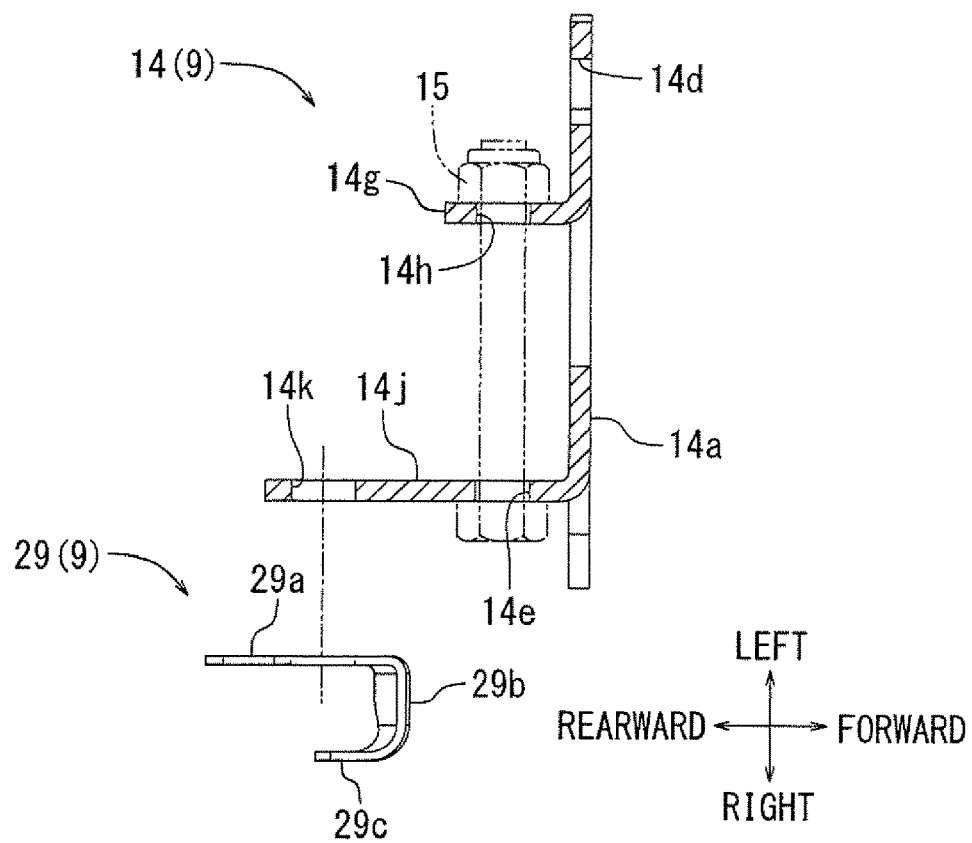
FIG. 15 is a partial sectional top view of the dust cover and the angular guide.

As shown in FIGS. 12 and 15, the front wall 29b connects the front edge of the first side wall 29a with the front edge of the second side wall 29c, and faces opposite to the outer peripheral edge of the saw blade 22 in the front-to-rear direction as shown in FIG. 5. The outer peripheral edge of the saw blade 22 is encompassed on three sides by a groove 29f defined collectively by the first side wall 29a, the second side wall 29c and the front wall 29b, and is positioned in the vicinity of the groove 29f. Therefore, by such enclosure of the saw blade 22, the cutting chips produced by the cutting action of the saw blade 22 during machining are accommodated by the groove 29f and flow along the groove 29f.

Figure 6:
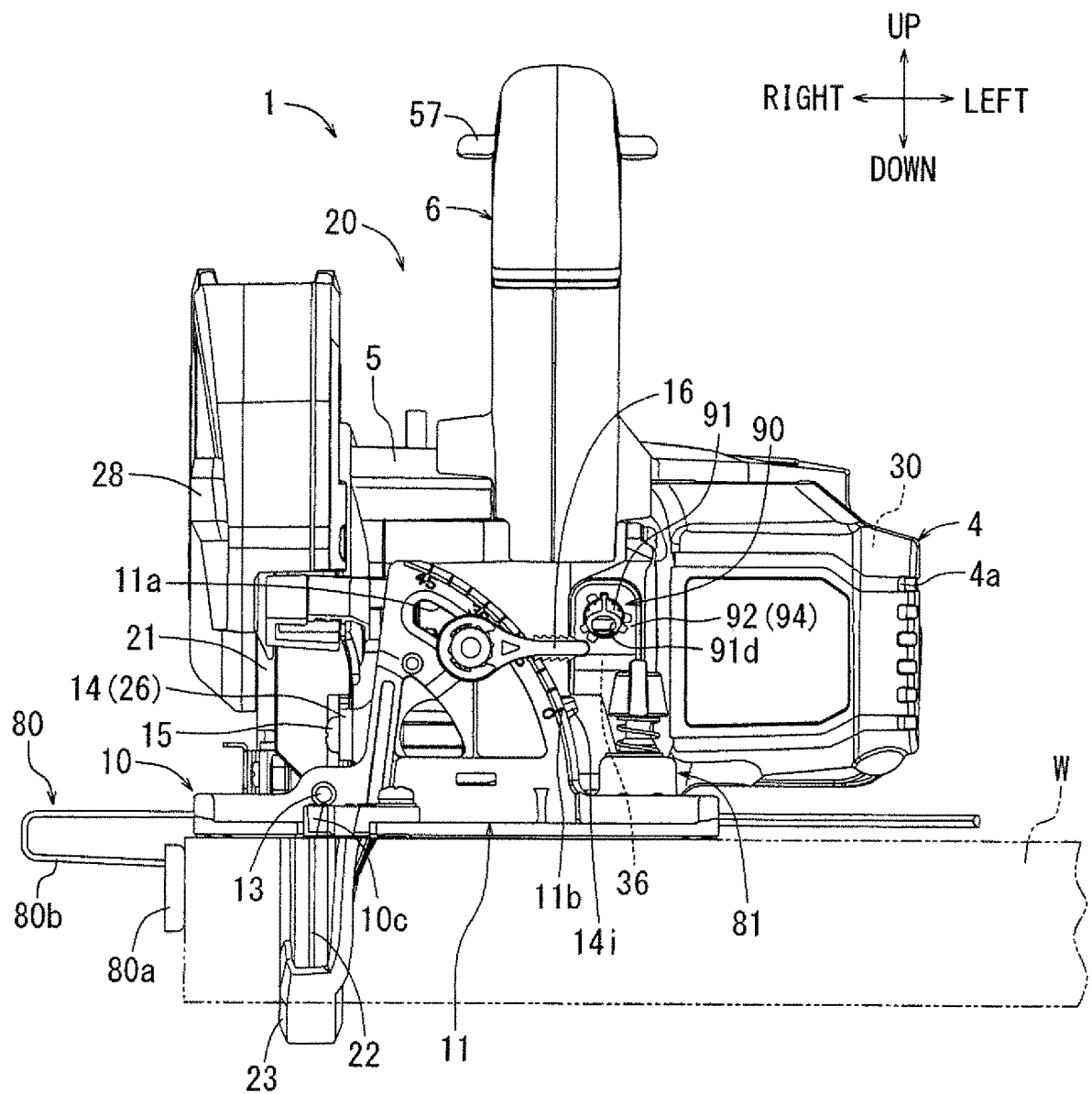
FIG. 6 is a front view of the portable circular saw.
Figure 7:
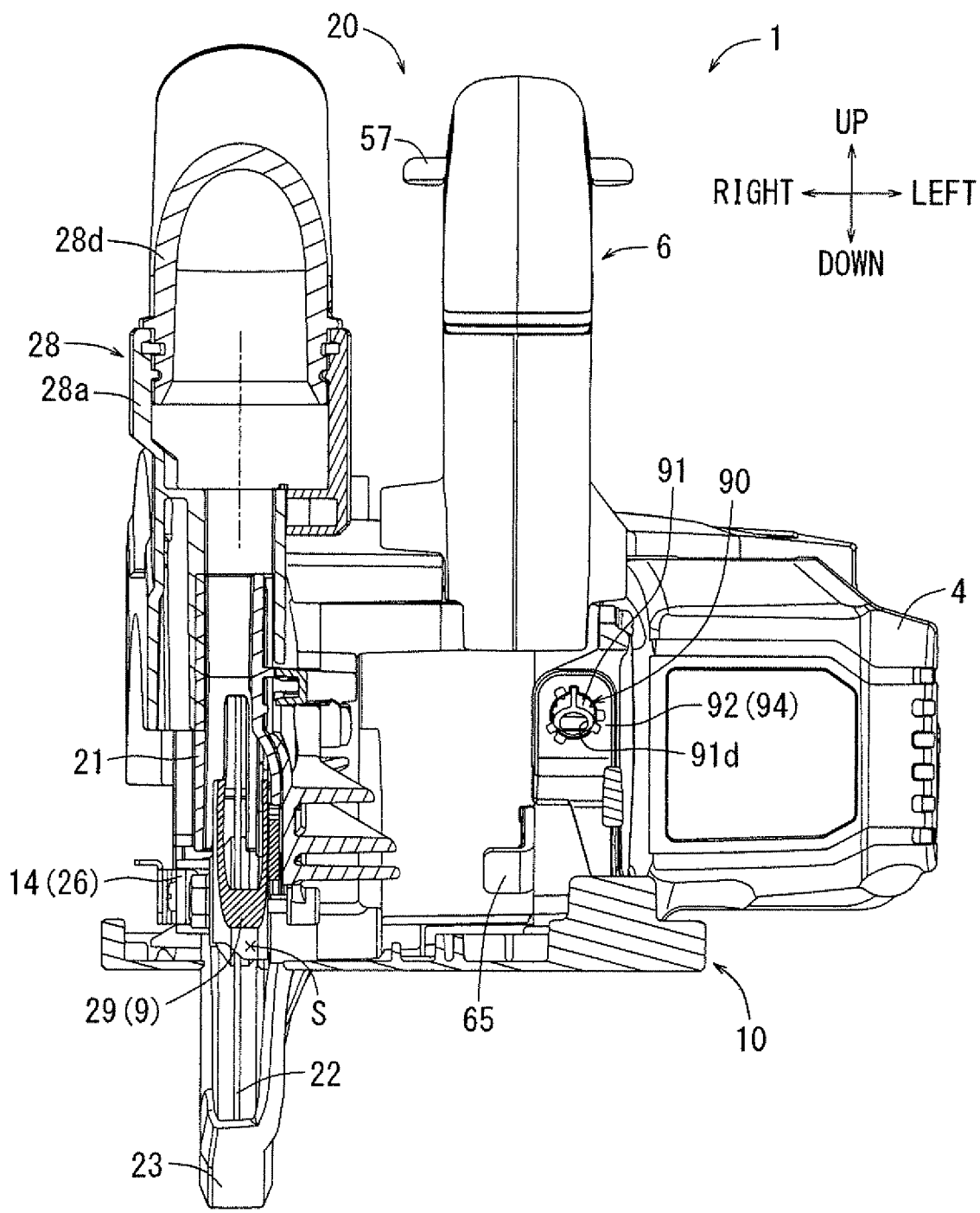
FIG. 7 is a front view of the portable circular saw that is partially removed.

As shown in FIGS. 12 to 15, the angular guide 14 has a front wall 14a, a first bracket 14j, and a second bracket 14g, where both brackets 14j and 14g are extending rearward from the front wall 14a. A hole 14c is formed at one end (right end) of the front wall 14a while an elongated hole 14d is formed at the other end (left end) of the front wall 14a. The hole 14c, into which a lateral tilting support shaft 13 shown in FIG. 6 is inserted, is circular in shape. Consequently, the angular guide 14 can tilt about the lateral tilting support shaft 13 relative to the base 10.

Figure 14:
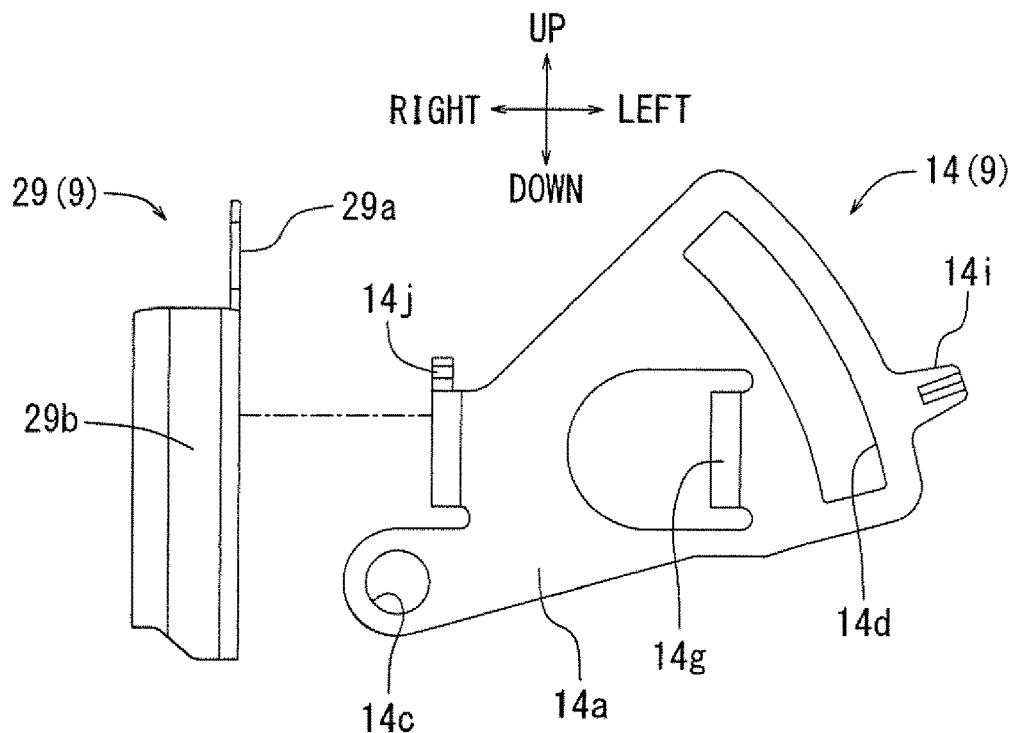
FIG. 14 is an exploded front view of the dust cover and the angular guide.

As shown in FIG. 14, the elongated hole 14d extends in a circular arc shape along a peripheral edge of the front wall 14a. A rearward-to-forward shaft portion of a knob screw 16 shown in FIG. 6 may be inserted in the elongated hole 14d. The shaft portion of the knob screw 16 may also be inserted in an elongated hole 11a formed in a front support portion 11 to the rear of the angular guide 14, that extends upright at the front end of the base 10. The elongated hole 11a may also be formed in a circular arc shape similar to the elongated hole 14d. The knob screw 16 may lock the angular guide 14 to the front support portion 11. Conversely, the knob screw 16, upon being rotated to the unlocking state, may release the angular guide 14 to allow the angular guide 14 to pivot around the lateral tilting support shaft 13 relative to the front support portion 11. As shown in FIGS. 6 to 9, the circular saw main body 20 may be tilted collectively with the angular guide 14 relative to the base 10 in the rightward/leftward direction and held relative to the base 10 by locking in the knob screw 16 at a desired tilt angle.

As shown in FIGS. 12 and 14, the angular guide 14 includes an indicator 14i extending outwardly (to the left) in a position opposite the hole 14c in the rightward/leftward direction. The indicator 14i may be seen from the front as it extends outwardly beyond the outer edge of the front support portion 11 shown in FIG. 6. An angle indication scale 11b extends along an outer peripheral edge arc of the front support portion 11. A lateral tilt angle of the angular guide 14 relative to the base 10 can be learned by reading the position of the indicator 14i wherein the position is indicated by indicator 14i. As will be described below, the circular saw main body 20 is attached to the angular guide 14. Therefore, the lateral tilt angle of the circular saw main body 20 can be learned by reading a position of the indicator 14i relative to the angle indication scale 11b, which is fixed.

Figure 8:
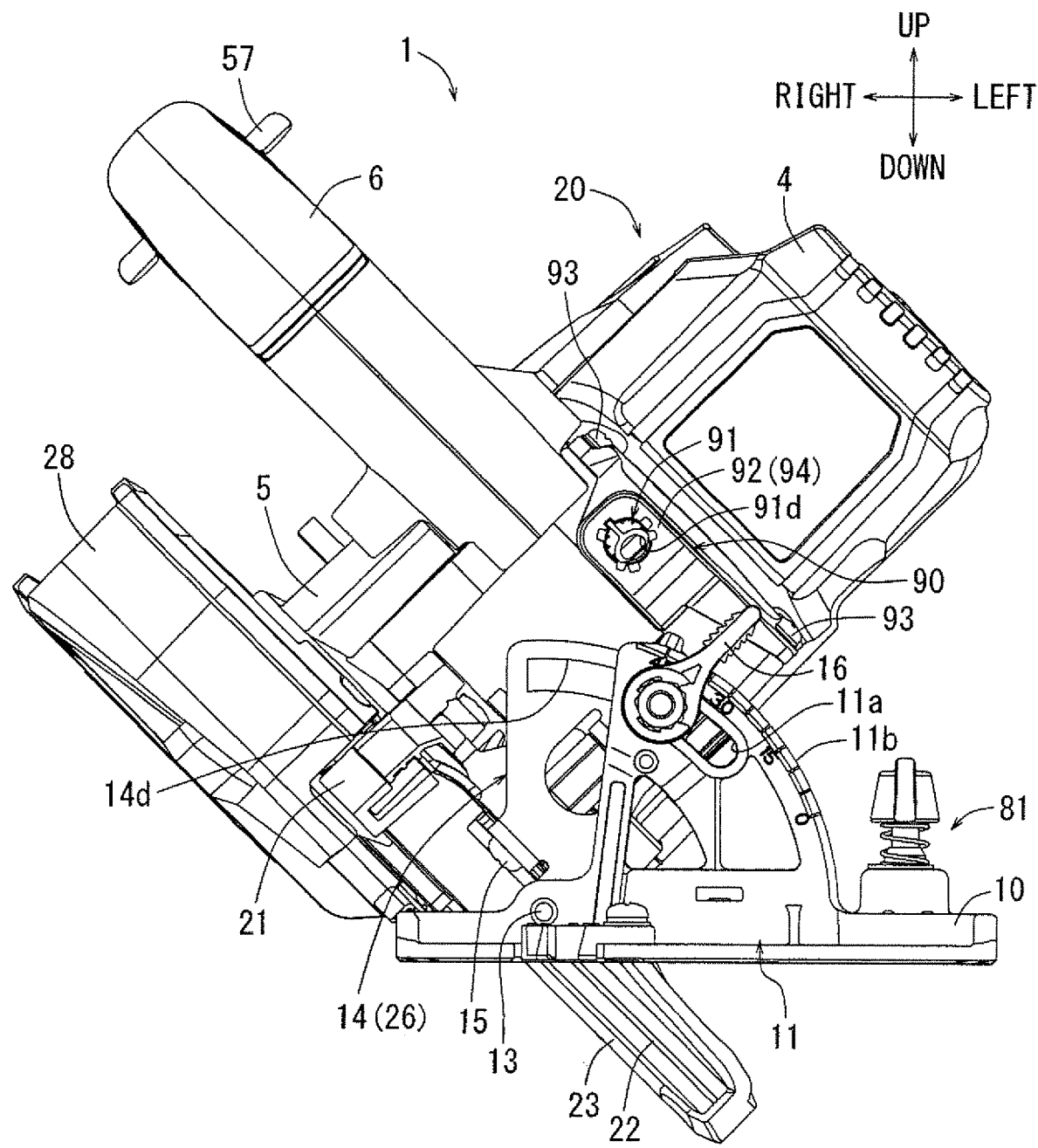
FIG. 8 is a front view of the portable circular saw when the circular saw main body is positioned in a tilted posture.

As shown in FIGS. 4 and 6, the lateral tilting support shaft 13 is positioned at a lower right part of the front support portion 11 and extends in the frontward/rearward direction. The lateral tilting support shaft 13 is inserted into the front support portion 11 and the hole 14c formed in the angular guide 14. The circular saw main body 20 is attached to the angular guide 14. Therefore, as shown in FIGS. 6 and 8, the angle of the circular saw main body 20 may be adjusted together with the angular guide 14 about the lateral tilting support shaft 13 in a rightward/leftward direction.

Figure 10:
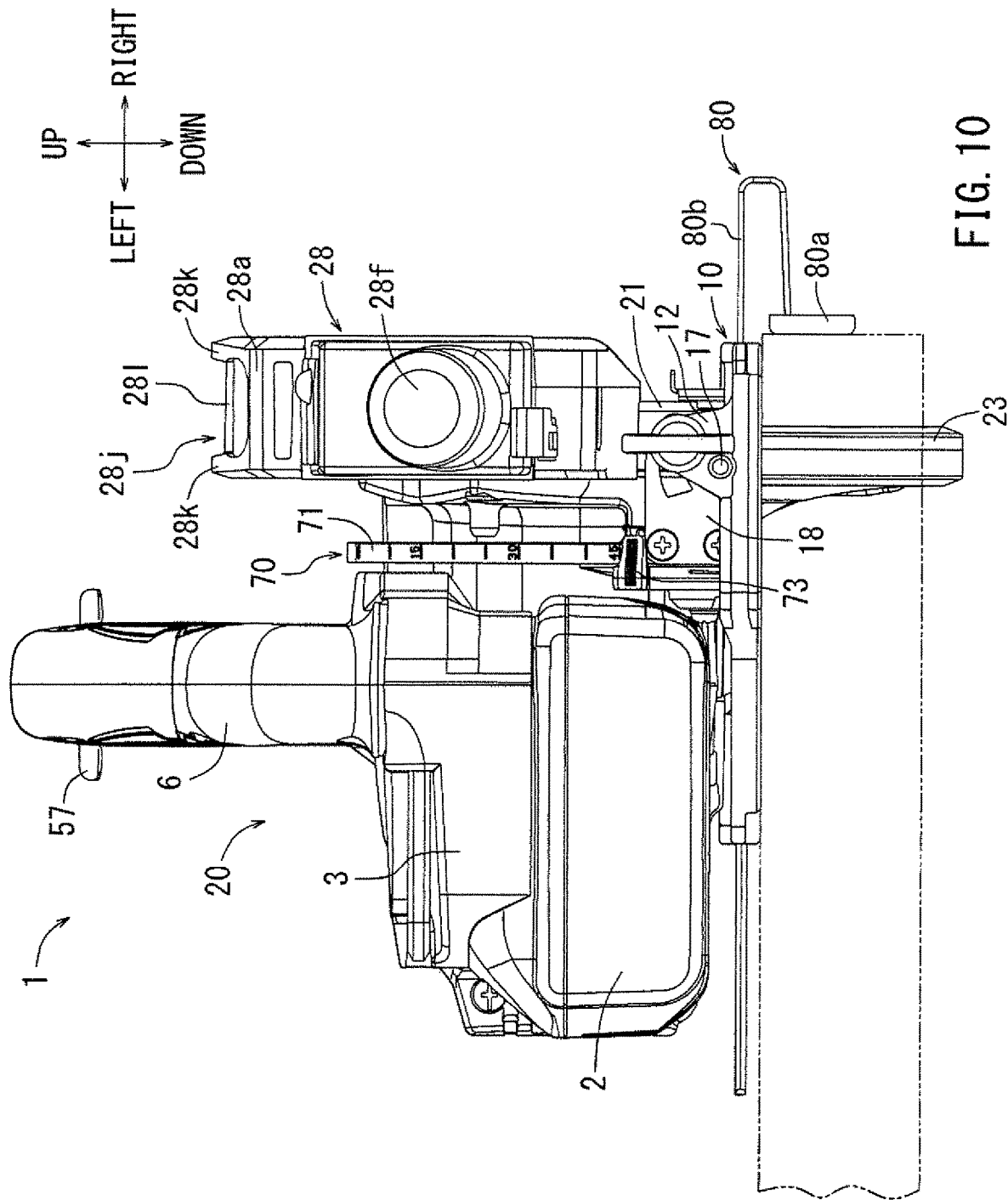
FIG. 10 is a rear view of the portable circular saw.

As shown in FIG. 10, a rear support portion 12 is provided in a rear region of the base 10. The rear support portion 12 extends upright from the base 10 and a tiltable plate 18 is attached to the rear support portion 12 via the lateral tilting support shaft 17. The tiltable plate 18 has an upwardly extending depth guide 71 to which the circular saw main body 20 is connected. The lateral tilting support shaft 17 is positioned on the same axis as that of the lateral tilting support shaft 13 shown in FIG. 6. Therefore, the angle of the circular saw main body 20 may be adjusted collectively about both of the lateral tilting support shafts 13 and 17 in the rightward/leftward direction. In this way, as shown in FIGS. 6 and 8, a cutting angle of the saw blade 22 with respect to the workpiece W may be adjusted such that so-called bevel cut may be executed.

As shown in FIGS. 12 to 15, the first bracket 14*j* extends rearward from one end (right end) of the front wall 14*a* while the second bracket 14*g* extends rearward from a central region of the front wall 14*a*. The first bracket 14*j* and the second bracket 14*g* extend rearward parallel to each other. A hole 14*e* is formed at the front portion of the first bracket 14*j*, and a hole 14*h* is formed at the same rearward position in the second bracket 14*g*. Thus, holes 14*e* and 14*h* into which the vertically pivotal support shaft 15 is inserted, are located on the same axis in the rightward/leftward direction. As shown in FIGS. 4 and 5, a front part of the circular saw main body 20 is pivotally connected to the vertically pivotal support shaft 15. Therefore, as shown in FIGS. 2 and 3, the circular saw main body 20 is vertically pivoted about the vertically pivotal support shaft 15 which extends in the rightward/leftward direction, relative to the base 10. In this way, a downward protruding amount of the saw blade 22 from the base 10 may be adjusted.

As shown in FIG. 1, the base 10 is slid on the workpiece W when the saw blade 22 cuts the workpiece W. The saw blade 22 extends downward from the base 10 and the cutting depth of the workpiece W is determined in accordance with downward protruding amount of the saw blade 22. A cutting depth adjusting mechanism 70 for adjusting the cutting depth is provided on a rear part of the base 10. The cutting depth adjusting mechanism 70 includes a depth guide 71 provided on the tiltable plate 18, which is rotatably attached to the base 10 as shown in FIG. 10.

As shown in FIGS. 4 and 10, the depth guide 71 is formed on an end of the tiltable plate 18 and extends in a circular arc shape upwardly and forwardly from the tiltable plate 18. A circular arc guide hole 71*a* is formed in the depth guide 71. A fixing screw 72 is inserted in the guide hole 71*a* and its leading end is screwed into a left side of the fixed cover 21. An operation portion comprising a fixing lever 73 is attached to a head portion of the fixing screw 72. By pulling the fixing lever 73 upward, the fixing screw 72 is loosened from the depth guide 71 such that the circular saw main body 20 can be vertically moved along with the fixing screw 72 relative to the depth guide 71. In this way, the protruding amount (cutting depth) of the saw blade 22 from the base 10 can be adjusted.

As shown in FIGS. 4 and 10, a scale is indicated on an outer periphery arc of the depth guide 71. The protruding amount of the saw blade 22 from the base 10 is discernable by a user by reading the position of the fixing screw 72 utilizing the scale of the depth guide 71. The fixing lever 73 may then be pushed downward at a user-desired position where the protruding amount has reached the desired amount. Here, at said position, the circular saw main body 20 is fixed by the fixing screw 72 relative to the depth guide 71. In this manner, the cutting depth of the saw blade 22 into the workpiece may be fixed.

As shown in FIGS. 2 and 3, the auxiliary cover 9 is tilted by the auxiliary cover tilting mechanism 25A relative to the circular saw main body 20. For example, the dust cover 29, which is one part of the auxiliary cover 9, is forwardly tilted with respect to the circular saw main body 20 by rotating the circular saw main body 20 from a lower position shown in FIG. 2 to an upper position shown in FIG. 3. The auxiliary cover tilting mechanism 25A includes cam surfaces 29*d* and 29*e* of the dust cover 29 and pins (cam follower) 19A and 19B which abut the cam surfaces 29*d* and 29*e*.

As shown in FIGS. 2 and 3, the pins 19A and 19B are provided on the circular saw main body 20. For example, the pins 19A and 19B may be provided on the fixed cover 21 and project from a left side surface 21*a* of the fixed cover 21 to the right. The pins 19A and 19B have a cylindrical columnar shape with the outer radial peripheral surface of each pin abutting a respective cam surface 29*d* or 29*e* of the dust cover 29. In particular, the pin 19A contacts a lower region of the cam surface 29*d* and the pin 19B contacts a lower region of the cam surface 29*e* when the circular saw main body 20 is placed in a lower position shown in FIG. 2. The pin 19A contacts an upper region of the cam surface 29*d* and the pin 19B contacts an upper region of the cam surface 29*e* when the circular saw main body 20 is placed in an upper position as shown in FIG. 3.

As shown in FIGS. 2 and 3, the pin 19A moves upward and pushes the cam surface 29*d* forward when the circular saw main body 20 is upwardly moved about the vertically pivotal support shaft 15 with respect to the base 10. As a result, due to the interaction of the upward movement of the pin 19A and the cam surface 29*d*, the dust cover 29 rotates clockwise about the shaft member 27A. Conversely, when the circular saw main body 20 is downwardly moved with respect to the base 10 about the vertically pivotal support shaft 15, the pin 19B moves downward and pushes the cam surface 29*e* forward. As a result due to the interaction of the downward movement of the pin 19B and the cam surface 29*e*, the dust cover 29 rotates counterclockwise about the shaft member 27A.

As shown in FIG. 13, a hole 14*k* is formed in a rear region of the first bracket 14*j* of the angular guide 14. The shaft member 27A is inserted into the hole 29*g* of the dust cover 29 and the hole 14*k*. Therefore, the dust cover 29 can rotate around the shaft member 27A and is pivotally connected to the base 10 via the angular guide 14.

As shown in FIG. 2, a lower end of the dust cover 29 is adjacent to the base 10 when the circular saw main body 20 is placed in a lower position. Accordingly, the dust cover 29 covers the gap S between the base 10 and the front end of the fixed cover 21. The front end position of the saw blade 22 corresponding to the intersection point of the saw blade 22 and the base 10 may move rearward by pivoting the circular saw main body from a lower position shown in FIG. 2 to the upper position shown in FIG. 3.

Correspondingly, the lower end of the dust cover 29 also moves rearward with respect to the base 10, commensurate with the movement of said intersection point. Therefore, the lower end of the dust cover 29 moves in a frontward/rearward direction when the dust cover 29 rotates so as to be always positioned in the vicinity of the saw blade 22. Therefore, the dust cover 29 is able to effectively cover the gap S between the base 10 and the front end of the fixed cover 21 irrespective of the pivot position of the circular saw main body 20 with respect to the base 10.

As shown in FIGS. 6 to 9, the angular guide 14 tilts with the circular saw main body 20 about the lateral tilting support shaft 13 when the circular saw main body 20 is tilted in the rightward/leftward direction. The dust cover 29 also tilts with the fixed cover 21, which is one part of the circular saw main body 20, around the lateral tilting support shaft 13. The position of gap S between the front end of the fixed cover 21 and the base is also shifted in the rightward/leftward direction when the circular saw main body 20 is tilted in the rightward/leftward direction. Therefore, to cover the gap S, the dust cover 29 also tilts in the rightward/leftward direction in accordance with the tilt angle of the circular saw main body 20 in the rightward/leftward direction. Consequently, the covering of the gap S between the front end of the fixed cover 21 and the base 10 by dust cover 29 is always maintained. For example, the dust cover 29 may move such that, the gap S between the front end of the dust cover 29 and the base 10 will always be equal to or less than 1 mm, preferably equal to or less than 0.5 mm.

As shown in FIGS. 6 to 9, the auxiliary cover 9 is tilted in the rightward/leftward direction with respect to the base 10 in accordance with the angle of the circular saw main body 20 in the rightward/leftward direction using the interlock mechanism 26 (angular guide 14). In particular, the angular guide 14 is pivotally connected to the base 10 around the lateral tilting support shaft 13. The auxiliary cover 9 is connected to the angular guide 14 via the shaft member 27A (see FIG. 3), which is inserted into the hole 14k of the angular guide 14. Thus, the auxiliary cover 9 may also tilt along with the angular guide 14 in the rightward/leftward direction with respect to the base 10 about lateral tilting support shaft 13 when the circular saw main body 20 is tilted along with the angular guide 14 in the rightward/leftward direction with respect to the base 10.

As shown in FIGS. 4 and 10, the circular saw main body 20 includes a battery mount portion 3, on which the battery 2 is mounted. The battery mount portion 3 is positioned on the left side of the rear part of the circular saw main body 20. The battery mount portion 3 extends, similar to the motor housing 4, from the left side of the fixed cover 21 in the left direction. The battery mount portion 3 is formed in a substantially planar shape, with rails on its lower surface. The rails extend, for example, in the rightward/leftward direction, and the battery 2 is removably mounted on the lower surface of the battery mount portion 3 utilizing said rails. The battery 2 serves as a battery for an electric power tool and may be mounted on electric power tools such as screw fasteners. The battery may be, for example, an 18V lithium-ion battery and can be charged independently with a separately provided charger. Therefore, the battery 2 may be repeatedly used as a power source, for example, for a dust-proof circular saw 1. The battery 2 electrically connects to a controller 61 shown in FIG. 5, and supplies electric power to the electric motor 30 via the controller 61.

As shown in FIGS. 4 and 5, the controller 61 is accommodated in a controller housing 7, which is provided between the battery mount portion 3 and the motor housing 4. Various electric components such as, for example, an electric motor 30, a sensor substrate 34 configured to detect a position of the rotor 30b and a switch 53 (see FIG. 1) provided on a handle 6 are connected to the controller 61. The controller 61 has a control circuit that serves to transmit a control signal based on location information of the rotor 30b detected on the sensor substrate 34. The controller 61 further includes a drive circuit comprising a field effect transistor (FET) for altering the electric current of the electric motor 30 based on the control signal(s) received from the control circuit, and an automatic breaker circuit for cutting off the power supply to the electric motor 30 in response to the detected battery 2 condition to avoid an over-discharged or over-current condition.

As shown in FIGS. 1 and 4, the handle 6 is angled such that it projects upwards, and includes an upright part 6a extending upright from the motor housing 4 and a grip part 6b, which is inclined in the rearward-to-forward direction from the battery mount portion 3 toward an upper portion of the upright part 6a. A trigger-type switch 53 is provided on a lower surface of the upper part of the grip part 6b. The switch 53 is supported on the grip part 6b so as to be operable in the vertical direction in a pullable manner via a support shaft, where the switch 53 is initially biased downward by a biasing member such as a compression spring. A user may pull the switch 53 upward with his or her fingertip of his hand gripping the handle part 6b to position the switch 53 against biasing force of the biasing member. As the switch 53 is pulled, it transmits a signal(s) to the controller 61 (see FIG. 5) for operation of the device. Subsequently, the controller 61 supplies electric power from the battery 2 to the electric motor 30. As a result, the electric motor 30 is activated, thereby rotating the saw blade 22 in the direction indicated by an arrow 28h.

As shown in FIGS. 1 and 6, a lock-on button 57 is provided on the handle 6. The lock-on button 57 is located above the switch 53 and passes through the handle 6 in the rightward/leftward direction. The lock-on button 57 is provided so as to be vertically manipulable relative to the handle 6. The electric motor 30 is locked in an activated state by pushing the lock-on button 57 downward while simultaneously the switch 53 is pulled upward to operate. As a result, the electric motor 30 may be driven without continuously pulling the switch 53. In this way, the operator can easily work for a long time. When the lock-on state is to be released, the switch 53 is pulled upward again to operate. By doing so, the lock-on button 57 returns to its original position.

As shown in FIG. 5, a cooling fan 36 may be attached to the motor shaft 30c of the electric motor 30. The cooling fan 36 may be located in the left-to-right direction between the rotor 30b and the bearing 32 so as to rotate together with the motor shaft 30c about shaft 30c. As the cooling fan 36 rotates, the motion of said rotation introduces external air into the motor housing 4 from vent holes 4a formed in the left wall of the motor housing 4. The introduced air in turn cools the electric motor 30 and subsequently flows into the controller housing 7 through a vent hole 4b formed in the rear part of the motor housing 4. The air may be discharged from an exhaust port 7a formed in the right wall of the controller housing 7 after cooling the controller 61 having a heat generating source such as a FET (Field Effect Transistor) or a micro-computer.

As shown in FIGS. 5 and 6, the circular saw main body 20 is provided with a blower mechanism 90 that serves to blow forward the air out of the motor housing 4. The blower mechanism 90 has a blower base 92 attached to the motor housing 4 and a rotary nozzle 91 attached to the blower base 92. The blower base 92 may be attached to the motor housing 4 to cover an opening 4d of the motor housing 4. The opening 4d is positioned radially outward of the cooling fan 36 i.e. in the flow path of the air from the cooling fan 36. The opening 4d is oriented in a forward direction and is covered by the blower base 92.

As shown in FIGS. 16 to 19, the blower base 92 includes a front wall 92a, and a peripheral wall 92b extending in the front-to-rear direction around the entire extent of the outer radial periphery of the front wall 92a. An upper arm 92e extends upward from an upper part of the peripheral wall 92b. An upper attachment portion 92f extends rearward from an upper end of an upper arm 92e. An attachment hole 92g is formed to pass through the upper attachment portion 92f in the rightward/leftward direction. A lower arm 92h downwardly extends from a lower part of the peripheral wall 92b. A lower attachment portion 92i rearwardly extends from a lower end of the lower arm 92h. An attachment hole 92j is formed in the lower attachment portion 92i that extends in the rightward/leftward direction.

Figure 9:
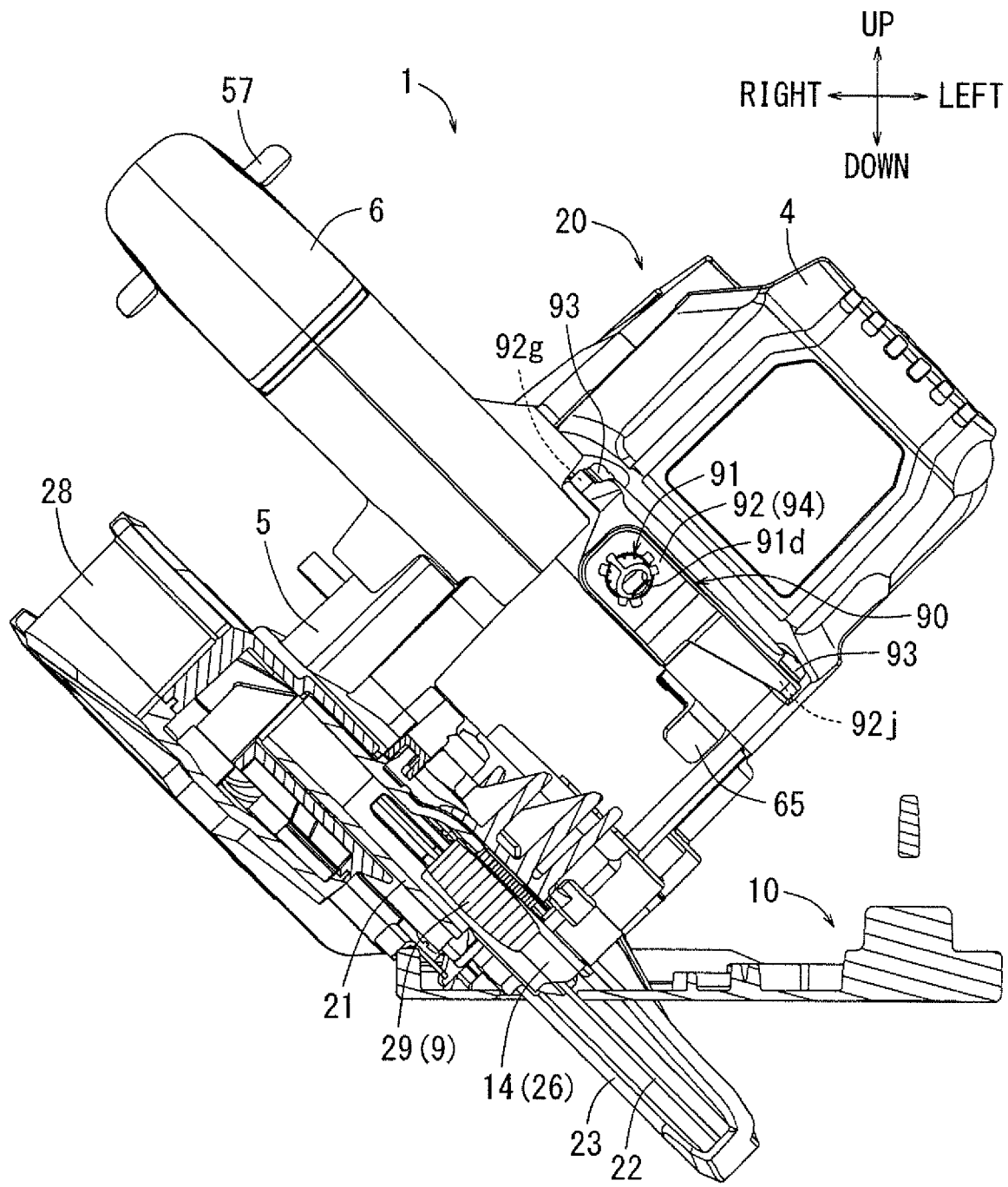
FIG. 9 is a front view of the portable circular saw that is partially removed when the circular saw main body is positioned in the tilted posture.
Figure 17:
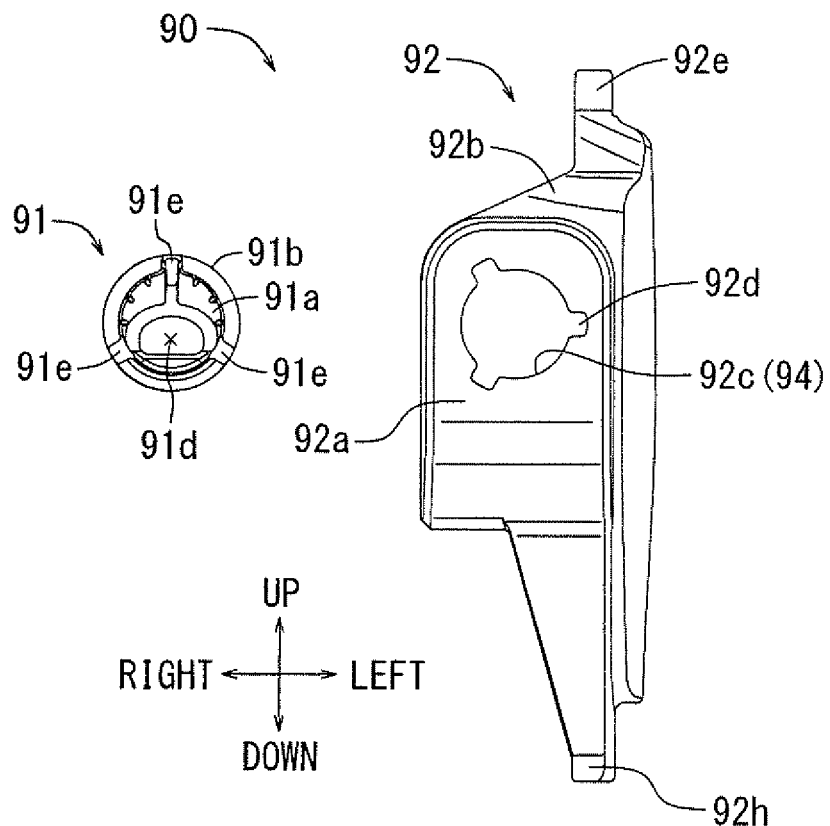
FIG. 17 is an exploded front view of the blower mechanism.

As shown in FIG. 9, the blower base 92 is mounted to a front surface of the motor housing 4 by screws 93 inserted into the attachment holes 92g and 92j. As shown in FIG. 17, a circular opening 92c and a plurality of extending grooves 92d are formed in the front wall 92a. The plurality of the extending grooves 92d is, for example, three radial grooves, extending radially outward from the opening 92c. The plurality of grooves 92d is positioned at equal intervals, for example, by 120 degrees. The rotary nozzle 91 is inserted through the opening 92c to be attached to the blower base 92.

As shown in FIGS. 16 to 19, the rotary nozzle 91 includes a cylindrical main body 91a, a neck 91c and a stopper portion 91b wherein these components are positioned coaxially with respect to each other about the longitudinal axis through the radial center of the cylindrical main body 91a. A plurality of outward radial projections 91e are formed on the outer radial peripheral surface of the cylindrical main body 91a. The plurality of the projections 91e project from the main body nozzle 91a in a radial direction and are arranged at equal intervals in a circumferential direction, corresponding to the intervals of the extending grooves 92d of the front wall 92a of the blower base 92. For example, three projections 91e may be arranged at intervals by 120 degrees. The projections 91e each have a predetermined axial length around the outer peripheral surface of the main body nozzle 91a. The rotary nozzle 91 is inserted into the opening 92c of the blower base 92 from the back such that the projections 91e pass through the extended grooves 92d.

As shown in FIGS. 16 to 19, the stopper portion 91b has a larger radial diameter than that of the main body nozzle 91a and that of opening 92c of the blower base 92. Therefore, because the rotary nozzle is inserted in the opening 92c of the blower base 92 in the rearward-to-forward direction from the rear, the front peripheral radial edge of the stopper portion 91b abuts the backside of the front wall 92a of the blower base 92 as the rotary nozzle 91 is inserted into the opening 92c. As a result, the rotary nozzle 91 is prevented from being pulled out in the forward direction from the blower base 92.

As shown in FIGS. 16 to 19, the projections 91e of the main body nozzle 91a are inserted into the extended grooves 92d of the blower base 92 from the back. Subsequently, the main body nozzle 91a rotates around an axis relative to the blower base 92, about the rearward-to-forward axis at the radial center of opening 92c. As a result, the projections 91e are positioned in front of the front wall 92a of the blower base 92 so that the rotary nozzle 91 is prevented from being pulled out rearward from the blower base 92. The neck 91c is positioned in the opening 92c when the rotary nozzle 91 is attached to the blower base 92.

Figure 16:
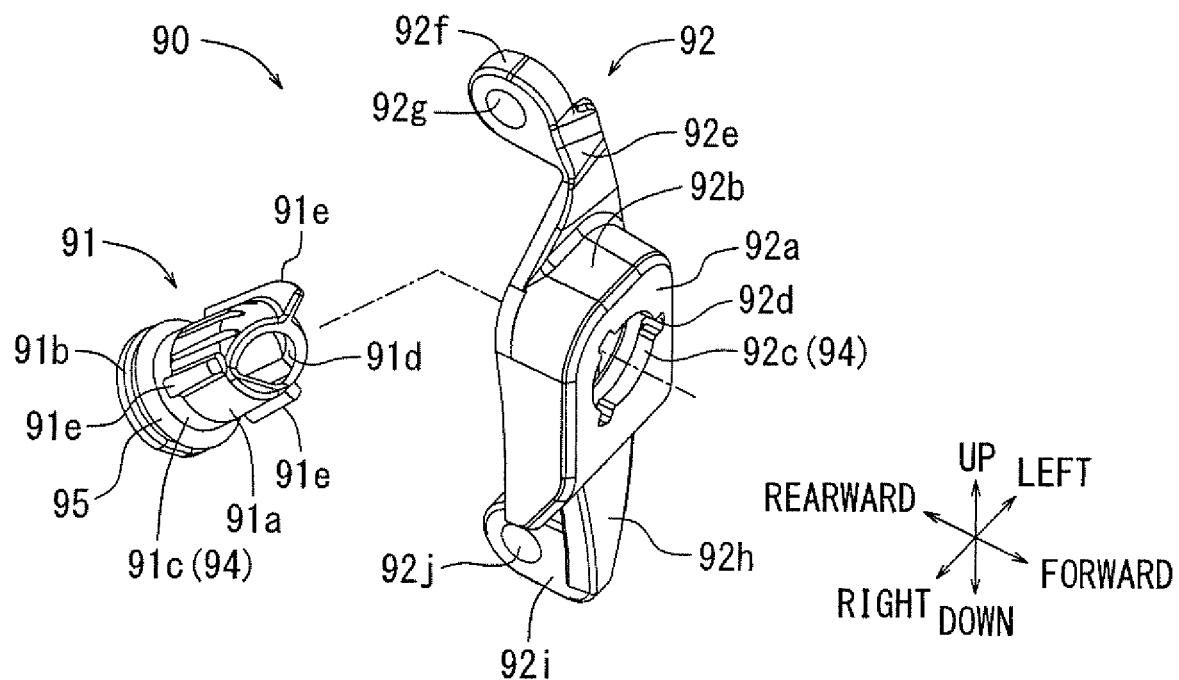
FIG. 16 is an exploded perspective view of a blower mechanism.
Figure 18:
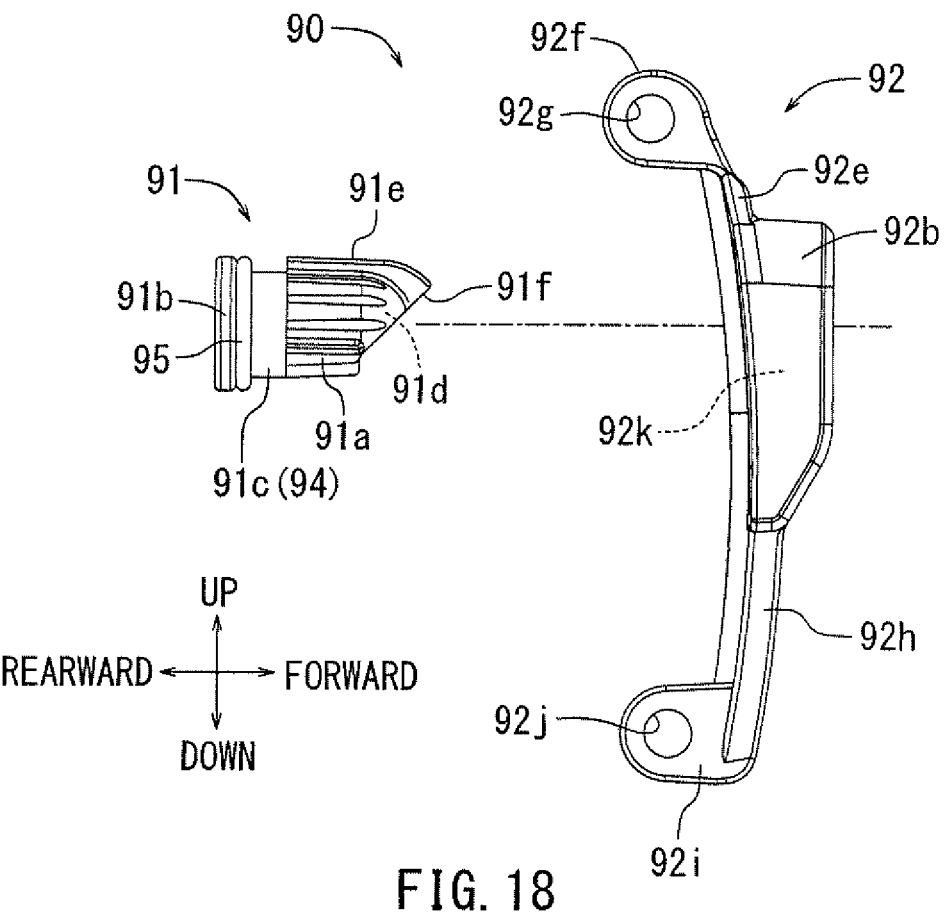
FIG. 18 is an exploded right side view of the blower mechanism.
Figure 19:
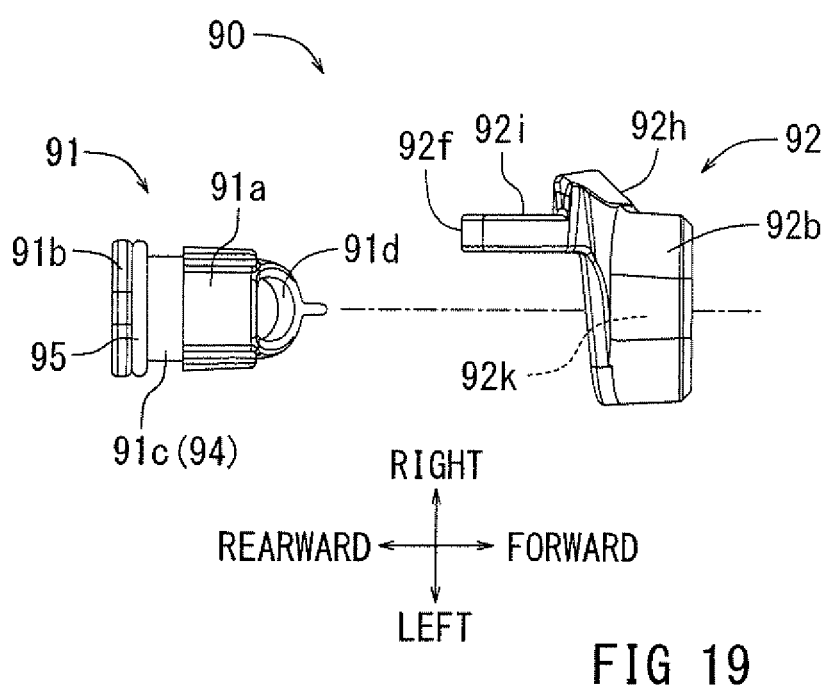
FIG. 19 is an exploded bottom view of the blower mechanism.

The orientation change mechanism 94 allows the rotary nozzle 91 to rotate around the aforementioned rearward-to-forward at the radial center of opening 92c axis relative to the blower base 92. As shown in FIGS. 16 and 18, the orientation change mechanism 94 includes the opening 92c of the blower base 92 and the neck 91c of the rotary nozzle 91. The neck 91c has the same diameter as that of the main body nozzle 91a but without projections 91e. The neck 91c has a cylindrical shape complementary to the circular opening 92c. Therefore, the neck 91c may be rotatably and stably supported in the opening 92c. In this way, the rotary nozzle 91 is rotatably connected the blower base 92 in the rearward-to-forward direction.

As shown in FIGS. 16 to 19, the orientation change mechanism 94 further includes the stopper portion 91b and the projections 91e that prevent the rotary nozzle 91 from being pulled out of the blower base 92. An O-ring 95 is attached on the neck 91c of the rotary nozzle 91. The O-ring 95 is positioned between the stopper portion 91b and the front wall 92a of the blower base 92 and covers the gap between the rotary nozzle 91 and the blower base 92 to seal the space between them.

As shown in FIGS. 16 and 18, the rotary nozzle 91 includes a front surface 91f inclined with respect to the front-to-rear axis, in the rear-to-front direction. The air outlet 91d extends along the front-to-rear axis of the rotary nozzle 91 and is also inclined at the leading end of the rotary nozzle 91. The inclination of the air outlet 91d is inclined with respect to the front-to-rear axis of the rotary nozzle 91 in the rear-to-front direction at the same inclination as the front surface 91f such that the air is blown out of the air outlet 91d at a predetermined angle with respect to the axis.

As shown in FIGS. 5 and 6, the blower mechanism 90 is positioned in front of the circular saw main body 20. The air flows from the cooling fan 36 to pass through the opening 4d of the motor housing 4 as well as to be introduced into the blower base 92. The air introduced into the blower base 92 passes through a through hole from the rear to the front along the rearward/forward axis of the rotary nozzle 91. The air outlet 91d of the rotary nozzle 91 is opened toward the front so that the air is blown out through the air outlet 91d toward the front.

As shown in FIG. 6, the rotary nozzle 91 is set at a desired angle rotated about the front-to-rear axis at its radial center. The air outlet 91d is oriented in the rightward/leftward direction or the upward/downward direction depending on the angle of the rotary nozzle 91 about the axis. Accordingly, the air blowing out of the air outlet 91d may be adjusted to blow out in the rightward/leftward direction or the upward/downward direction.

As shown in FIGS. 5 and 6, the blower mechanism 90 is positioned outside of the radial rotational path of the cooling fan 36 and instead is positioned in a directed flow path of the air from the cooling fan 36, wherein said flow path is produced by the rotation of cooling fan 36. Therefore, the distance from the cooling fan 36 to the air outlet 91d is short so that frictional resistance to the air flowing therebetween is minimized, allowing the flow velocity to be maintained at a substantial level. Consequently, the velocity of the air blowing out of the air outlet 91d is relatively high. The orientation of the air blown out of the air outlet 91d is determined by the orientation of the rotary nozzle 91, perpendicular to the inclination plane of the front surface 91f. For example, the air may flow toward the marking line guide 10c when the rotary nozzle's air outlet 91d is oriented to face the marking line guide 10c of the base 10, such that the inclination plane of the front surface 91f is perpendicular to the direction from the air outlet 91d to the marking line guide 10c.

As shown in FIGS. 5 and 6, the marking line guide 10c is provided on the front end of the base 10 and is formed by cutting out the both right and left sides at the front end of the base 10 immediately adjacent to said guide. The saw blade 22 may be moved in a precise manner by a user shifting the base 10 forward while the marking line guide 10c moves along a marking line which may be marked on the workpiece W. The chips accumulated near the marking line guide 10c may then be blown away by the air coming out of the air outlet 91d when the air outlet 91d of the blower mechanism 90 is oriented toward the marking line guide 10c as described above. As a result, because of said configuration, the visibility of the marking line guide 10c is improved so that machining work can be carried out precisely and quickly.

As shown in FIG. 5, a lock lever 44 is vertically tiltably connected to a front part of the gear housing 5. The lock lever 44 is connected to a lock member that serves to lock the spindle 41 in a non-rotatable manner. That is, the spindle 41 can be locked/unlocked in a non-rotatable and rotatable manner respectively by operation of the lock lever 44. As a result, the saw blade 22 can be attached to and removed from the spindle 41.

Figure 11:
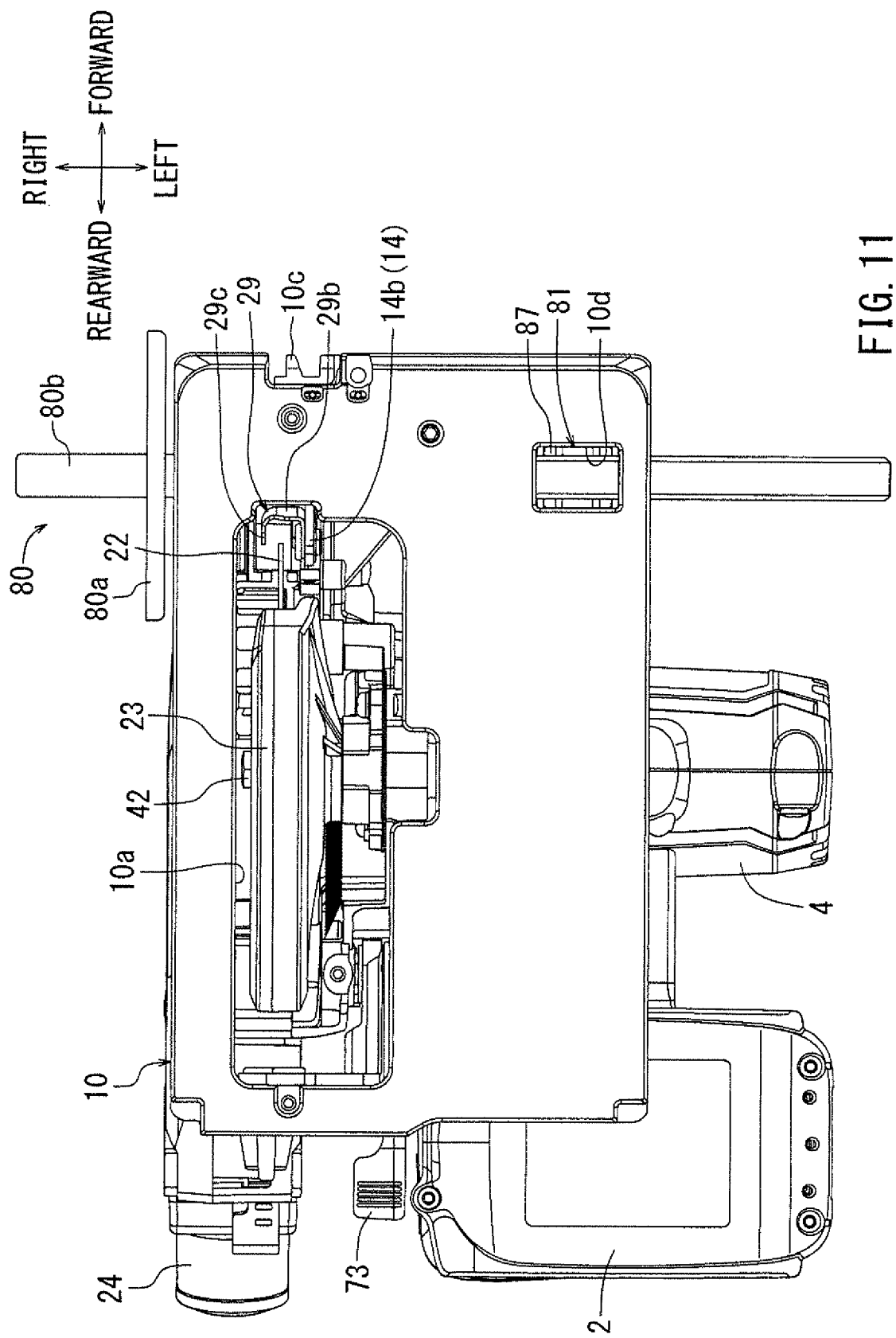
FIG. 11 is a bottom view of the portable circular saw.

As shown in FIGS. 1 and 11, the base 10 is formed in a substantially planar shape. The circular saw main body 20 is supported above the base 10 such that its vertical as well as its lateral angle can be adjusted. A substantially rectangular window 10a is formed in the base 10 through which the saw blade 22 is inserted. A parallel ruler 80 is attached to a front part of the base 10 such that its position can be adjusted in the rightward/leftward direction.

As shown in FIGS. 4 and 6, the parallel ruler 80 includes a connecting bar 80b attached to the base 10 and a ruler main body 80a provided at an end of the connecting bar 80b. The ruler main body 80a is positioned on the right side of the base 10. The base 10 is placed on the workpiece W and the ruler main body 80a abuts the lateral surface of the workpiece W when the workpiece W is machined. The dust-proof circular saw 1 is forwardly moved with the ruler main body 80a abutting the lateral surface of the workpiece W. In this way, the dust-proof circular saw 1 can be moved parallel to the lateral surface of the workpiece W so as to allow the workpiece W to be cut to a predetermined width.

As shown in FIGS. 4 and 6, the connecting bar 80b has a plate shape elongated in the rightward/leftward direction and extends to the right and left sides of the width of the base 10. One end of the connecting bar 80b extends downward and is bent back to extend beneath the base 10. The ruler main body 80a is provided on the bent-back end of the connecting bar 80b, perpendicular to the left/right direction of the connecting bar 80b. The ruler main body 80a is elongated in a frontward/rearward direction and oriented via the connecting bar 80a in the rightward/leftward direction toward the base 10. Therefore, the ruler main body 80a is able to abut an end surface of the workpiece W.

As shown in FIG. 4, a downwardly indented ruler retaining groove 10e that serves to slidably accommodate the connecting bar 80b is formed in the base 10. Both right and left ends of the ruler retaining groove 10e are open at the rightmost and leftmost sides of the base 10. Consequently, the position of the ruler main body 80a in the rightward/leftward direction may be adjusted by sliding the connecting bar 80b along the ruler retaining groove 10e in the rightward/leftward direction. The connecting bar 80b is fixed to the base 10 by a ruler fixing device 81.

Figure 20:
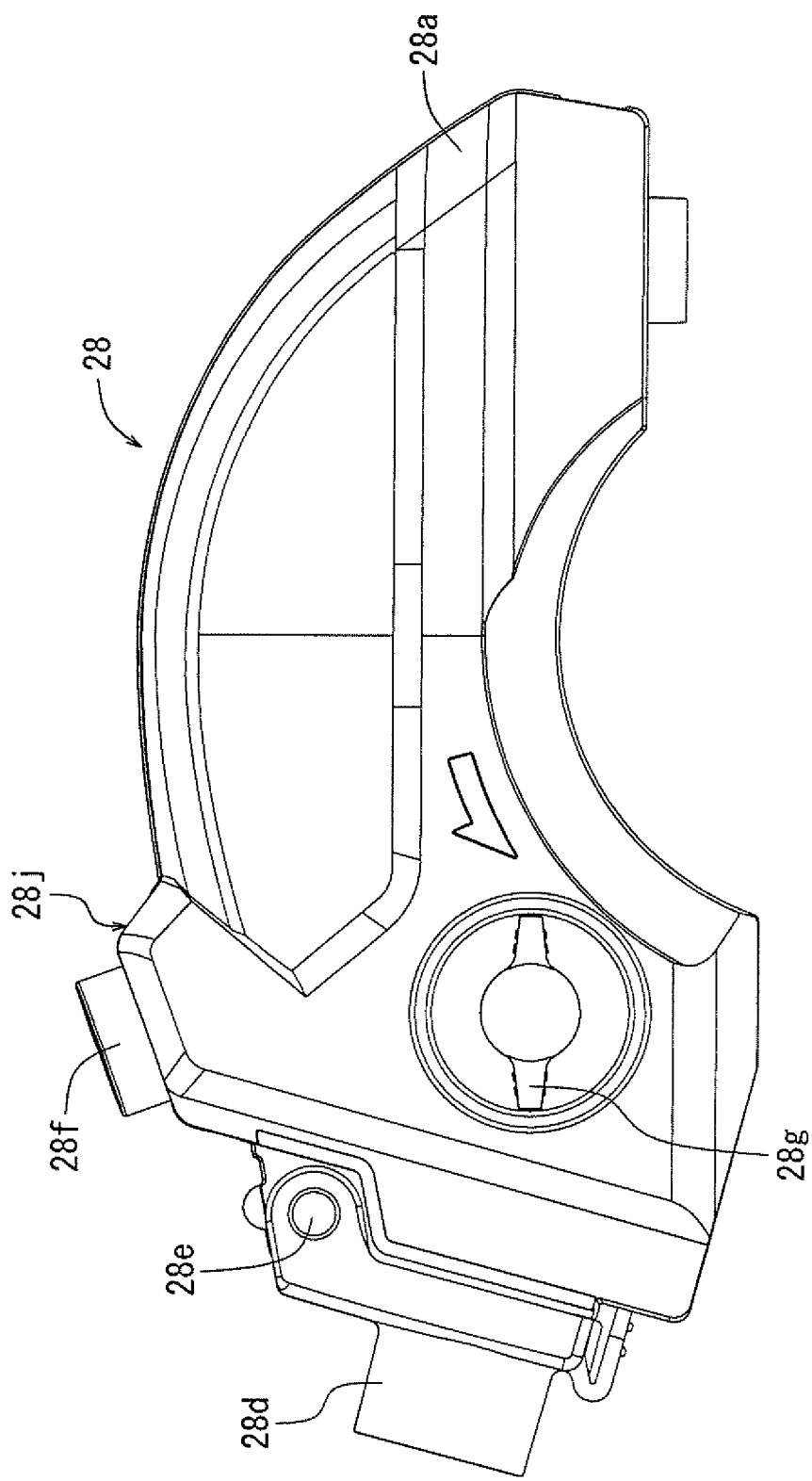
FIG. 20 is a right side view of a dust box.
Figure 21:
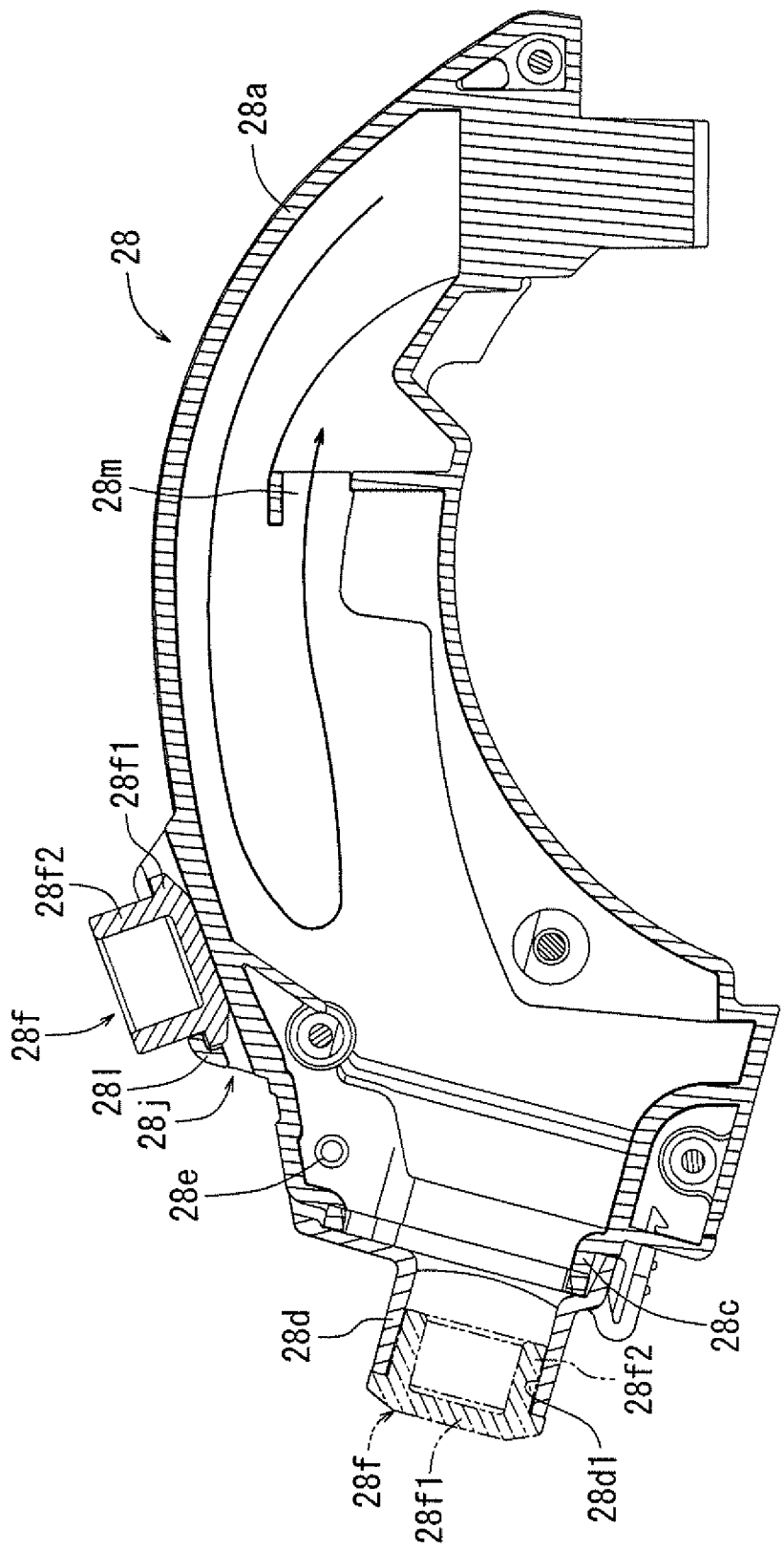
FIG. 21 is a vertical sectional view of the dust box.
Figure 22:
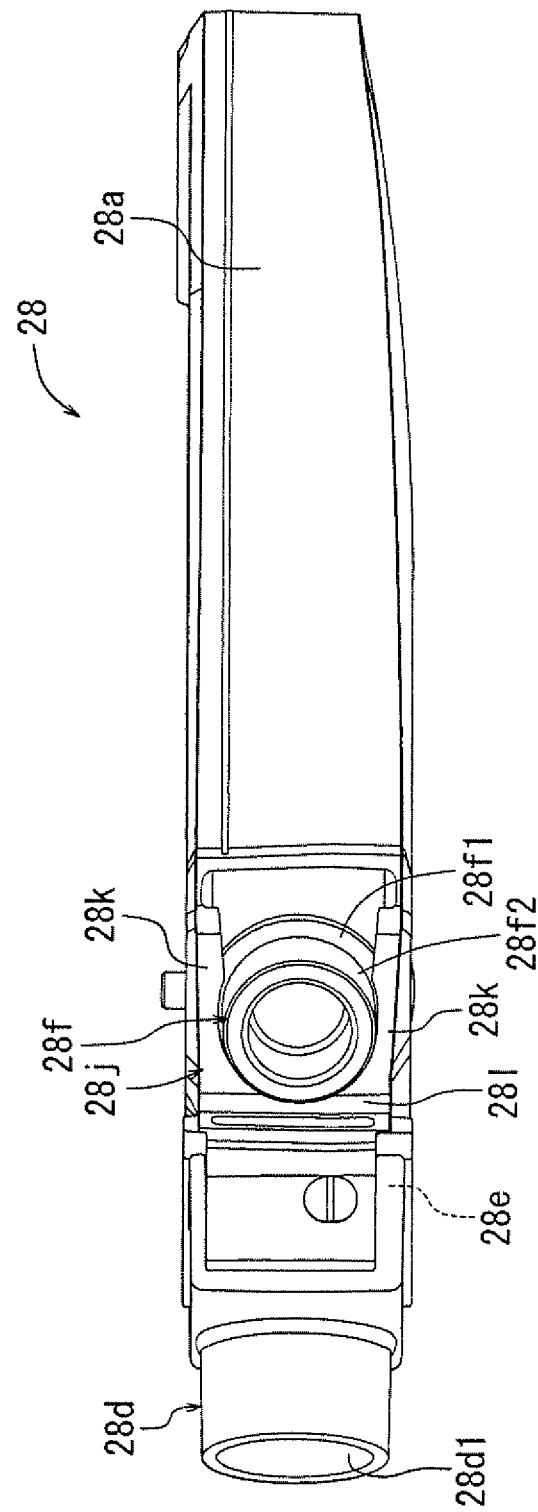
FIG. 22 is a top view of the dust box.

As shown in FIGS. 20 to 22, the dust box 28 includes a temporary holding mechanism 28j for temporarily holding the cap 28f which is removed from the cover 28d. The temporary holding mechanism 28j has pair of rails 28k and a bridge portion 28l configured to connect rear ends of the pair of rails 28k. The pair of the rails 28k extend in the frontward/rearward direction along the outer peripheral surface of the box main body 28a. The bridge portion 28l covers a gap between itself and the outer peripheral surface of the box main body 28a. The cap 28f has a tubular portion 28f2 to be inserted into an opening 28d1 of the cover 28d and a cover portion 28f1 for covering the opening 28d1 upon said insertion. The cover portion 28f1 is circular with a larger diameter than that of the tubular portion 28f2 and extends radially outward a vertical end of the tubular portion 28f2.

As shown in FIGS. 21 and 22, to be stored with the temporary holding mechanism 28j, the cap 28f is moved rearward along the rails 28k while the cover portion 28f1 of the cap 28f is inserted below the rails 28k. As a result, as shown in FIG. 22, the cover portion 28f1 is positioned below the bridge portion 28l and the rail 28k, and the tubular portion 28f2 protrudes upward between the rails 28k. When the cap 28f is to be removed from the temporary holding mechanism 28j, the cap 28f is moved forward along the rails 28k. The cutting chips and the air within the dust box 28 flow from the front to the rear, where the cutting chips may accumulate at the rear of the dust box 28 due to the weight of the cutting chips. As shown by the arrow in FIG. 21, the flow path of the air is from the front to the back and subsequently downward and back to the front of the dust box 28, where it is finally discharged through a release hole 28m. Subsequently, the air may, for example, turn and flow rightward within the fixed cover 21 may ultimately be discharged out of the fixed cover 21.

The above-mentioned dust-proof circular saw (portable cutting device) 1 includes a base 10 to be placed on the workpiece W, a circular saw main body (cutting device main body) 20 supported on the upper surface of the base and equipped with the electric motor 30, a saw blade 22 driven by the electric motor 30 and extending downwardly from the base 10. The dust-proof circular saw 1 further includes a cooling fan 36 driven by the electric motor 30 configured to guide air to the electric motor 30 for cooling the electric motor 30, and a blower mechanism 90 configured to blow the air out of the cutting device main body (cutting device main body) 20 generated by the fan 36 in order to blow the cutting chips away in a direction the blower mechanism 90 is oriented towards. The blower mechanism 90 includes an air outlet 91d configured to blow out the air, and an orientation change mechanism 94 capable of changing the orientation of the air outlet 91d.

Therefore, the orientation of the air blown out of the blower mechanism 90 can be set at a desired angle in accordance with the working condition. For example, the orientation of the air can be adjusted to a position of the cutting chips to be removed. Alternatively, cutting chips floating in front of the eyes of the user can be blown away by orienting the air in the horizontal or upward direction as required. This configuration is effective for example when fine chips may be produced during cutting a siding board(s) or a plaster board(s), since the drifting fine chips in the work-site by said cutting may be blown away by the blower mechanism 90 in a direction so as to not disturb work. This may facilitate enhanced operation of the cutting device and at the same time improve the environment at the work-site.

Alternatively, the orientation of the air may also be set in a predetermined direction so that no objects are located in the way of the air blown out of the blower mechanism 90. Still alternatively, the orientation of the air blown out of the blower mechanism 90 may be directed diagonally front right from the center or from the left side of the front face of the cutting device (circular saw main body 20). In this way, air may flow from the side of the user through cutting points in a direction so as to not to disturb the user's line of sight. Alternatively, by directing the orientation of the air to the front, it is possible to blow away the cutting chips accumulated on a portion of the workpiece, which may be positioned relatively far away from the cutting device.

The above-mentioned dust-proof circular saw (portable cutting device) 1 has a blower mechanism 90 as shown in FIG. 6. The blower mechanism 90 has an air outlet 91d for blowing out the air and is set in such an orientation that the air outlet 91*d* can blow off the chips drifting in the air in front of the circular saw main body (cutting device main body) 20. In this way the chips floating in front of the eyes of the user can be blown away.

As shown in FIGS. 6 and 16, the blower mechanism 90 may have an orientation change mechanism 94 capable of changing the orientation of the air outlet 91*d*. Therefore, the orientation of the air blown out of the blower mechanism 90 may be set at a desired angle.

As shown in FIGS. 6 and 16, the orientation change mechanism 94 for the blower mechanism 90 may change the orientation of the air outlet 91*d* in both rightward/leftward and upward/downward directions. Therefore, the blower mechanism 90 may blow floating chips or accumulated chips in any one of the upper, lower, left or right locations. Chips accumulated on the upper surface of the base 10 or the upper surface of the workpiece W near the base 10 may be blown away when the orientation of the air is directed downward. Chips drifting in the air may be removed from the front of the eyes of the user when the orientation of the air is directed upward and leftward/rightward as needed.

As shown in FIGS. 6 and 16, the orientation change mechanism 94 of the blower mechanism 90 has a rotary nozzle 91, which is rotatably connected to the circular saw main body (cutting device main body) 20. Therefore, the orientation of the air outlet 91*d* can be changed by rotating the rotary nozzle 91 relative to the circular saw main body 20.

As shown in FIG. 5, the blower mechanism 90 is located at a radially outer position relative to the cooling fan 36, adjacent to the location where cooling air is generated by the cooling fan 36. The blower mechanism 90 may change the orientation of the air blown out of the blower mechanism 90. Therefore, it is not necessary to provide a piping to direct the air to the desired location. Also, because the friction loss caused by passing through the piping may be reduced by not providing a piping, the reduction of the air velocity by providing piping may also be prevented.

The dust-proof circular saw 1 has been described above as one example of a portable cutting device. Alternatively, the portable cutting machine may be, for example, a cutter device where a diamond wheel is rotated as a circular blade. Alternatively, the portable cutting device may have a reciprocally movable saw blade and may be, for example, a jigsaw. The jigsaw may have a reciprocating motion converting mechanism configured to change the rotational motion from the motor into the reciprocal motion, and a saw blade (cutting blade) to be attached to an output shaft.

The above-described portable cutting device is so-called rechargeable type and may have a battery 2. Alternatively, the portable cutting device may have a cord configured to receive electric power from a commercial power source.

The blower mechanism 90 may be adjacent to the radial outer periphery of the fan 36. Alternatively, the blower mechanism 90 may also be provided at another location, other than the tool main body (circular saw main body 20), so as to blow the air out from that location.

The above-mentioned rotary nozzle 91 may be rotatably attached about the axis extending in the forward/rearward direction at the radial center of the cylindrical main body 91*a* with respect to the tool main body (circular saw main body 20). Therefore, the orientation of the air blown out from the blower mechanism 90 is determined in the range of 360 degrees around said substantially horizontal axis. Alternatively, the rotary nozzle 91 may instead be rotatably mounted so as to be rotatable within a predetermined angular range around the axis extending in the forward/rearward direction and consequently the orientation of the air may be determined within a predetermined angular range around the substantially horizontal axis.

Still alternatively, the rotary nozzle 91 may be rotatably mounted to the tool main body (circular saw main body 20) around a substantially vertical axis. As a result, the orientation of the air blown out from the blower mechanism 90 may be changed in the rightward/leftward direction. Still alternatively, the rotary nozzle 91 may be rotatably mounted to the tool main body (circular saw main body 20) around the axis extending in the rightward/leftward direction. Therefore, the orientation of the air blown out from the blower mechanism 90 may be changed in the upward/downward direction.

Alternatively, the rotary nozzle 91 may be attached via a ball joint to the tool main body (circular saw main body 20). The ball joint may have a spherical portion provided in the rotary nozzle 91 and a holding portion for rotatably holding the spherical portion, while the holding portion may be provided in the tool main body or the blower base 92. In this way the angle of the rotary nozzle 91 can be changed in various directions so that the orientation of the air blown out from the blower mechanism 90 may consequently also be changed in various directions.

Cutting chips are chips having a relatively small diameter generated while cutting a workpiece. The smaller the diameter or the lighter they are, the more likely they will be scattered in the air. For example, a siding, which is one type of workpiece, has small specific gravity, therefore, chips produced by cutting a siding are liable to be scattered in the air.

The various exemplary embodiments described above in detail with reference to the attached drawings are intended to be representative of the present invention and thus non limiting embodiments. The detailed description is intended to teach a person of skill in the art to make, use and/or practice various aspects of the present teachings and thus does not limit the scope of the invention in any manner. Furthermore, each of the additional features and teachings disclosed above may be applied and/or used separately or with other features and teachings in any combination thereof, to provide improved portable cutting devices and/or methods of making and using the same.

What is claimed is:

1. A portable cutting device comprising:
    a base configured to be placed on a workpiece;
    a cutting device main body supported on an upper side of the base;
    an electric motor;
    a cutting blade (i) configured to be driven by the electric motor and (ii) extending downwardly from the base;
    a cooling fan configured to be driven by the electric motor and to cool the electric motor by blowing air to the electric motor; and
    a blower mechanism (i) configured to direct the air, which has cooled the electric motor, out of the cutting device main body in a direction oriented towards cutting chips generated by the cutting blade to blow the cutting chips and (ii) including:
        a blower base having a circular hole,
        a nozzle including a flange and a neck with an air outlet at an end of the neck, the nozzle being configured to fit into the circular hole, the flange having a circular shape at a rear end of the flange, the neck (i) is adjacent to the flange along a front-to-rear axis of the portable cutting device and (ii) has a cylindrical shape concentric with the flange about the front-to-rear axis, and an orientation change mechanism that is configured to rotate an entirety of the nozzle about a longitudinal rotational axis of the nozzle to change the orientation of the air outlet, wherein three recesses protruding radially outwardly are formed as part of the circular hole and at equal intervals in a circumferential direction.

2. The portable cutting device of claim 1, wherein the orientation change mechanism is configured to change the orientation of the air outlet in leftward, rightward, upward, and downward directions.

3. The portable cutting device of claim 1, wherein the nozzle is rotatably connected to the blower base.

4. The portable cutting device of claim 1, wherein the neck includes: a first portion disposed at a rear end of the neck, the first portion having a cross-section of a circular shape, and a second portion disposed at a front end of the neck, the second portion having a cross-section of a circular shape with three outward radial projections at equal angular intervals.

5. The portable cutting device of claim 4, wherein the cross-section of the second portion is substantially the same as a cross-section of the circular hole.

6. The portable cutting device of claim 4, wherein the orientation change mechanism includes the first portion.

7. The portable cutting device of claim 6, wherein:
the nozzle is rotatable 360 degrees within the blower base, and
upon rotation of the nozzle to a desired angle, a space occupied by the flange within the blower base remains unchanged.

8. The portable cutting device of claim 7, wherein the nozzle is rotatable about the front-to-rear axis at a radial center of the circular hole of the blower base.

9. The portable cutting device of claim 1, wherein the air outlet is disposed at a front end of the nozzle.

10. The portable cutting device of claim 9, wherein the air outlet is inclined from a rear of the portable cutting device to a front of the portable cutting device.

11. The portable cutting device of claim 1, wherein a first distance between the longitudinal axis of the nozzle and a rotor of the electric motor is less than a second distance between the longitudinal axis of the nozzle and the cutting blade.

* * * * *